US008948236B2

(12) United States Patent
Mukai et al.

(10) Patent No.: US 8,948,236 B2
(45) Date of Patent: Feb. 3, 2015

(54) RADIO TERMINAL DEVICE, RADIO BASE STATION DEVICE, RADIO RANGING SYSTEM, AND RADIO RANGING METHOD

(75) Inventors: Hirohito Mukai, Tokyo (JP); Takashi Fukagawa, Kanagawa (JP); Yoichi Nakagawa, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 529 days.

(21) Appl. No.: 13/266,749

(22) PCT Filed: Apr. 20, 2010

(86) PCT No.: PCT/JP2010/002848
§ 371 (c)(1),
(2), (4) Date: Oct. 27, 2011

(87) PCT Pub. No.: WO2010/125767
PCT Pub. Date: Nov. 4, 2010

(65) Prior Publication Data
US 2012/0044974 A1    Feb. 23, 2012

(30) Foreign Application Priority Data

Apr. 28, 2009   (JP) ................................. 2009-109479
Nov. 27, 2009   (JP) ................................. 2009-270523

(51) Int. Cl.
H04B 1/38    (2006.01)
H04L 27/00   (2006.01)
G01S 13/76   (2006.01)

(52) U.S. Cl.
CPC .................................. *G01S 13/767* (2013.01)
USPC ............ 375/220; 375/316; 375/295; 375/297

(58) Field of Classification Search
CPC .......... G06K 7/10366; G06K 7/10009; G06K 7/10405; G06K 19/0701; G06K 7/10376; G08B 13/2434; G08B 13/2448; G08B 13/2468; H04B 17/0057; H04B 1/38; H04B 1/44; H04B 1/7105; H04B 2203/5491; H04B 7/0608; H04W 4/008; G01S 3/046; H03L 7/16

USPC ......... 375/211, 214, 219, 220, 222, 256, 295, 375/297, 316, 318, 345, 344; 340/572.1–572.9, 10.1, 10.3

See application file for complete search history.

(56) References Cited

U.S. PATENT DOCUMENTS 4,042,926 A    8/1977   Anderson et al.
5,017,930 A    5/1991   Stoltz et al.
(Continued)

FOREIGN PATENT DOCUMENTS

JP    51117889        10/1976
JP    2007212420 A    8/2007

OTHER PUBLICATIONS

IEEE Standard 802.154a, Aug. 31, 2007, 2 pages.
(Continued)

*Primary Examiner* — Sam K Ahn
*Assistant Examiner* — Linda Wong
(74) *Attorney, Agent, or Firm* — Seed IP Law Group PLLC

(57) ABSTRACT

Disclosed are a radio terminal device and the like, which achieve an improvement in the accuracy of ranging between a UWB reader and a UWB tag regardless of whether an active method or a semi-passive method. In a terminal (300), a timing control unit (340) outputs, to a transmission amplifier (350), a control signal for performing on-off control such that on the basis of the reception timing of a pulse signal transmitted from a base station (200) and a representative value of a circuit delay time required from when a reception pulse signal is received until a transmission pulse signal generated in response to a detection signal of the reception pulse signal is transmitted, the transmission amplifier (350) amplifies a reradiation pulse generated in response to a detection signal of the pulse signal transmitted from the base station (200); and a re-reradiation pulse generated in response to a detection signal of the reradiation pulse.

11 Claims, 18 Drawing Sheets

(56) References Cited

U.S. PATENT DOCUMENTS

| | | | |
|---|---|---|---|
| 5,406,561 A * | 4/1995 | Arai | 370/315 |
| 7,030,761 B2 * | 4/2006 | Bridgelall et al. | 340/572.2 |
| 7,672,363 B2 * | 3/2010 | Bokhour | 375/221 |
| 2002/0186163 A1 | 12/2002 | Morchel et al. | |
| 2003/0013146 A1 * | 1/2003 | Werb | 435/9 |
| 2003/0143947 A1 * | 7/2003 | Lyu | 455/7 |
| 2003/0174048 A1 | 9/2003 | McCorkle | |
| 2005/0206555 A1 * | 9/2005 | Bridgelall et al. | 342/127 |
| 2006/0104198 A1 | 5/2006 | Takano | |
| 2006/0158370 A1 | 7/2006 | Kurashima et al. | |
| 2007/0217379 A1 | 9/2007 | Fujiwara et al. | |
| 2008/0136644 A1 * | 6/2008 | McCorkle | 340/572.3 |
| 2009/0116572 A1 * | 5/2009 | Fujita et al. | 375/267 |
| 2009/0287853 A1 * | 11/2009 | Carson | 710/16 |
| 2010/0164690 A1 * | 7/2010 | Raphaeli et al. | 340/10.2 |
| 2010/0231435 A1 | 9/2010 | Zhen et al. | |
| 2011/0274141 A1 * | 11/2011 | Jantunen et al. | 375/138 |

OTHER PUBLICATIONS

International Search Report for PCT/JP2010/002848, dated Jul. 27, 2010, 1 page.

Extended European Search Report, dated Oct. 1, 2012, for European Application No. 10769469.7-2220, 7 pages.

Park et al., "Round-Trip Time-based Wireless Positioning without Time Synchronization," International Conference on Control, Automation and Systems 2007, Seoul, Korea, Oct. 17-20, 2007, 4 pages.

* cited by examiner

TERMINAL
RECEPTION PULSE
SIGNAL

TERMINAL RECEPTION
PULSE SIGNAL
(RE-RADITION PULSE)

BASE STATION
RECEPTION PULSE
SIGNAL

FIG.18A  BASE STATION RECEPTION PULSE SIGNAL
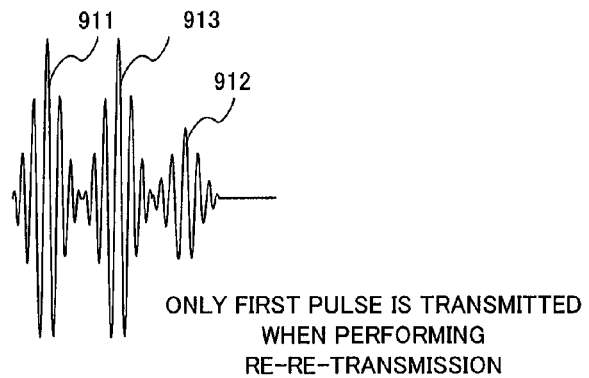
ONLY FIRST PULSE IS TRANSMITTED WHEN PERFORMING RE-RE-TRANSMISSION
FIG.18B  BASE STATION RECEPTION PULSE SIGNAL
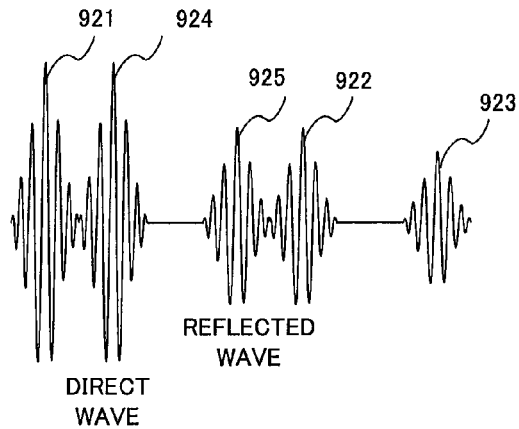
DIRECT WAVE
REFLECTED WAVE

RADIO TERMINAL DEVICE, RADIO BASE STATION DEVICE, RADIO RANGING SYSTEM, AND RADIO RANGING METHOD

TECHNICAL FIELD

The present invention relates to a radio terminal apparatus, a radio base station apparatus, a radio distance measurement system, and a radio distance measurement method for measuring a distance using an ultra wide band (UWB) pulse signal.

BACKGROUND ART

One example of a high-speed radio transmission technique is the ultra wide band (UWB) communication scheme. The UWB communication scheme is a technique for performing communication in a ultra wide band using a pulse signal sequence formed with pulse signals that synchronize with a predetermined periodic timing. As an example of UWB communication, a method for using a pulse signal sequence formed with extremely-fine pulse signals, having a pulse width of, for example, one nanosecond or narrower, without using a carrier wave, is known. When using this kind of a UWB pulse, because the width of a transmission pulse is extremely narrow, it is known that accurate distance measurement is possible even in a multipath propagation environment.

For example, a UWB pulse signal is transmitted from a UWB reader, which is a radio base station apparatus (hereinafter referred to as "base station") to a UWB tag, which is a radio terminal apparatus (hereinafter referred to as "terminal"), and after the UWB tag receives the UWB pulse signal, the UWB pulse signal is retransmitted from the UWB tag to the UWB reader. Then, by measuring the round-trip time, it is possible to measure the distance between the UWB reader and the UWB tag.

IEEE802.15.4a (low-rate UWB standard), which is a standard for specifying the physical layer of the UWB low transmission rate, discloses the two-way ranging (TWR) technique (see Non-Patent Literature 1). Non-Patent Literature 1 discloses concrete examples of the accuracy of distance measurement by the difference of frequencies of crystal oscillators between a base station and a terminal, and the improvement method thereof.

Further, Patent Literature 1 discloses a technique for measuring the difference between the transmission-side clock and the reception-side clock by receiving a preamble transmitted from a base station at a terminal, then re-radiating that preamble using the terminal's clock, and measuring the duration at the base station.

CITATION LIST

Patent Literature

PTL 1
Japanese Patent Application Laid-Open No.2007-212420

Non-Patent Literature

NPL 1
IEEE Std 802.15.4a-2007, August 2007

SUMMARY OF INVENTION

Technical Problem

However, in the above-described conventional art, when an assumption is made that the active method in which the UWB tag performs synchronous demodulation in the tag as is the case with a communication apparatus, and then returns the transmission signal to the reader, is adopted, it is necessary to manage delay time in the UWB tag as accurately as crystals, for example. That is, in order to ensure the accuracy of 30 cm, for example, it is necessary to manage the reference clock in the UWB tag at the timing with high frequency, such as 1 GHz. However, accompanying increase of the operation clock of the UWB tag, there is a problem that the power consumption increases and the battery life of the UWB tag shortens.

On the other hand, the semi-passive method in which a UWB signal is simply amplified in the tag, or after amplification, the UWB signal is subject to envelope detection and a UWB pulse is re-radiated, has an advantage of suppressing power consumption of the UWB tag. However, the passive method does not have the synchronous clock in the UWB tag, and therefore has a problem that it is difficult to manage the variation of the circuit delay time in the UWB tag.

Circuit delay is caused by a delayed signal due to a wiring length of each section or a circuit of each section of the UWB tag. For example, when the UWB tag includes a low noise amplifier (LNA) as a reception amplifier; a detector, a comparator and an oscillator as a transreceiver circuit of the UWB tag; and a power amplifier (PA) as a transmission amplifier; delay time of about several tens of nanoseconds occurs in each section. Regarding this circuit delay time, generally, it is possible to input an input signal from the reception end of the UWB tag, and measure in advance an output signal output from the transmission end, using, for example, a network analyzer, and it is also possible to record the circuit delay time obtained by the measurement as a correction value in the UWB tag.

However, in reality, circuit delay time varies depending on the difference of delay time due to individual differences of configuration circuits of the UWB tags or the change of the temperature with respect to the characteristics of a wide band of the UWB, so that, when using the data measured in advance as a correction value, an error of circuit delay time occurs and consequently an error of distance measurement occurs. As described above, because the absolute value of circuit delay time is about several tens of nanoseconds, when, for example, there is ten percent of a circuit delay time error, the error will be about several nanoseconds. Then, the error of about several nanoseconds will become a distance measurement error of 30 cm or more, which is the scale that cannot be ignored compared to the measurement error of radio wave propagation time between the reader and the tag.

It is therefore an object of the present invention to provide a radio terminal apparatus, a radio base station apparatus, a radio distance measurement system, and a radio distance measurement method that can improve the accuracy of distance measurement between a UWB reader and a UWB tag, regardless of whether the active method is employed or the semi-passive method is employed.

Solution to Problem

A radio terminal apparatus according to the present invention employs a configuration to be a radio terminal apparatus in a radio distance measurement system that measures a distance between a radio base station apparatus and the radio terminal apparatus using a pulse signal, the radio terminal apparatus includes: a reception antenna; a detection section that detects a reception pulse signal and outputs a detection signal; a generation section that generates a transmission pulse signal according to the detection signal; an amplification section that amplifies the transmission pulse signal; a transmission antenna that transmits the amplified transmission pulse signal; and a timing control section that outputs a control signal that controls the amplification section on and off, so as to amplify a re-radiation pulse signal generated according to the detection signal of a pulse signal transmitted from the radio base station apparatus and a re-re-radiation pulse signal generated according to the detection signal of the re-radiation pulse signal, to the amplification section, based on a representative value of circuit delay time of the radio terminal apparatus required while the reception pulse signal is received and then the transmission pulse signal that is generated according to the detection signal of that reception pulse signal is transmitted.

A radio base station apparatus according to the present invention employs a configuration to be a radio base station apparatus in a radio distance measurement system that measures a distance between the radio base station apparatus and a radio terminal apparatus using a pulse signal, the radio base station apparatus includes: a transmission section that transmits a pulse signal; a reception section that receives a re-radiation pulse signal that is generated by re-radiating the transmitted pulse signal, in the radio terminal apparatus, and a re-re-radiation pulse signal that is generated by re-re-radiating the re-radiation pulse signal in the radio terminal apparatus; and a measurement section that measures circuit delay time of the radio terminal apparatus based on a time difference between a reception timing of the re-radiation pulse signal and a reception timing of the re-re-radiation signal.

A radio distance measurement system according to the present invention employs a configuration to be a radio distance measurement system that measures a distance between a radio base station apparatus and a radio terminal apparatus using a pulse signal, wherein: the radio base station apparatus includes a transmission section that transmits a pulse signal; a reception section that receives a re-radiation pulse signal that is generated by re-radiating the transmitted reception signal, in the radio terminal apparatus, and a re-re-radiation pulse signal that is generated by re-re-radiating the re-radiation pulse signal in the radio terminal apparatus; and a measurement section that measures circuit delay time of the radio terminal apparatus based on a time difference of reception timings between the re-radiation pulse signal and the re-re-radiation signal; and the radio terminal apparatus includes: a reception antenna; a detection section that detects a reception pulse signal and outputs a detection signal; a generation section that generates a transmission pulse signal according to the detection signal; an amplification section that amplifies the transmission pulse signal; a transmission antenna that transmits the amplified transmission pulse signal; and a timing control section that outputs a control signal that control the amplification section on and off so as to amplify a re-radiation pulse signal generated according to the detection signal of the pulse signal transmitted from the radio base station apparatus and a re-re-radiation pulse signal generated according to the detection signal of the re-radiation pulse signal, to the amplification section, based on a representative value of the circuit delay time of the radio terminal apparatus required while the reception pulse signal is received and then the transmission pulse signal that is generated according to the detection signal of that reception pulse signal is transmitted.

A radio distance measurement method according to the present invention employs a configuration to be a radio distance measurement method of measuring a distance between a radio base station apparatus and a radio terminal apparatus using a pulse signal; the method includes: at the radio base station apparatus: transmitting a pulse signal; at the radio terminal apparatus: detecting a reception pulse signal and outputting a detection signal; amplifying a re-radiation pulse signal generated according to the detection signal of the pulse signal transmitted from the radio base station apparatus and a re-re-radiation pulse signal generated according to the detection signal of the re-radiation pulse signal; and transmitting the amplified transmission pulse signal; and at the radio base station apparatus: receiving the re-radiation pulse signal and the re-re-radiation pulse signal; measuring circuit delay time of the radio terminal apparatus based on a time difference between a reception timing of the re-radiation pulse signal and a reception timing of the re-re-radiation signal; and measuring round trip time of a radio wave including the circuit delay time of the radio terminal apparatus based on a time difference between a transmission timing of the transmitted pulse signal and the reception timing of the re-radiation pulse signal, and calculating the distance based on the round trip time and the circuit delay time of the radio terminal apparatus.

Advantageous Effects of Invention

According to the present invention, it is possible to improve the accuracy of distance measurement between a UWB reader and a UWB tag, regardless of whether the active method is employed or the semi-passive method is employed.

BRIEF DESCRIPTION OF DRAWINGS

FIG. 18 shows a transmission pulse signal of a terminal and a reception pulse signal of a base station.

DESCRIPTION OF EMBODIMENTS

Now, embodiments of the present invention will be described in detail with reference to the accompanying drawings.

(Embodiment 1)

[Overview of Radio Distance Measurement System]

Figure 1:
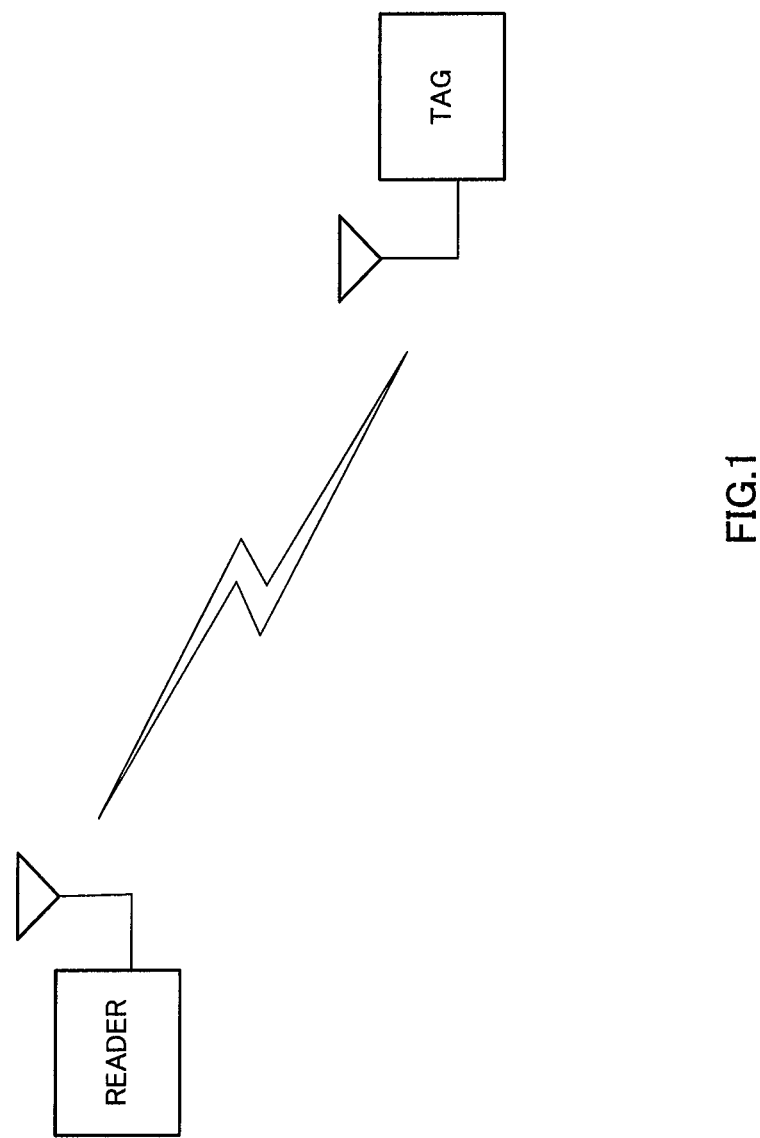
FIG. 1 is a schematic diagram showing a radio distance measurement system according to Embodiment 1 of the present invention.

FIG. 1 shows a radio distance measurement system according to the present embodiment of the present invention. In FIG. 1, the radio distance measurement system includes a reader, and a tag for which the distance from the reader is measured by the reader. Although a case will be described below where the radio distance measurement system has one tag, for easier explanation, the number of tags is not limited to one.

The reader measures the distance to the tag. Specifically, according to the present embodiment, the reader measures circuit delay time in the tag and spatial propagation time to the tag (including the circuit delay time in the tag), and calculates the distance from the spatial propagation time from which the circuit delay time is removed. For measurement of circuit delay time and spatial propagation time, an ultra wide band (UWB) radio signal of the impulse method is used.

An overview of the radio distance measurement system according to the present embodiment will be described below.

The reader first transmits a UWB pulse.

The tag receives this UWB pulse at the reception antenna, and transmits a response UWB pulse corresponding to the reception UWB pulse. When the semi-passive method is applied, the reception UWB pulse is amplified in the tag or is subject to envelope detection after amplification. Then, after the reception UWB pulse is amplified or is subject to envelope detection after amplification, a UWB pulse is generated again. Then, the generated UWB pulse is re-radiated (retransmitted), and is transmitted as a response UWB pulse. Hereinafter, the response UWB pulse generated by re-radiating the reception UWB pulse is called a re-radiated pulse.

Further, the tag receives this re-radiated pulse at the reception antenna of that tag, and transmits a response UWB pulse according to the received re-radiated pulse. When the semi-passive method is applied, the received re-radiated pulse is amplified in the tag or is subject to envelope detection after amplification, and a UWB pulse is generated again. Then, the generated UWB pulse is re-radiated, and is transmitted as a response UWB pulse. Hereinafter, the response UWB pulse generated by being reflected or re-radiated by that tag is called a re-re-radiated pulse.

The reader receives a re-radiated pulse or a re-re-radiated pulse transmitted from the tag. The reader measures spatial propagation time to the tag from the transmission timing of the transmitted UWB pulse and the reception timing of the re-radiated pulse. This spatial propagation time includes circuit delay time in the tag. Here, the circuit delay time in the tag refers to time required while the tag receives a UWB pulse and then transmits a response UWB pulse corresponding to that UWB pulse. The reader measures the circuit delay time in the tag from the reception timings of a re-radiated pulse and a re-re-radiated pulse.

A method of measuring spatial propagation time and circuit delay time will be described below with reference to FIG. 2.

Figure 2:
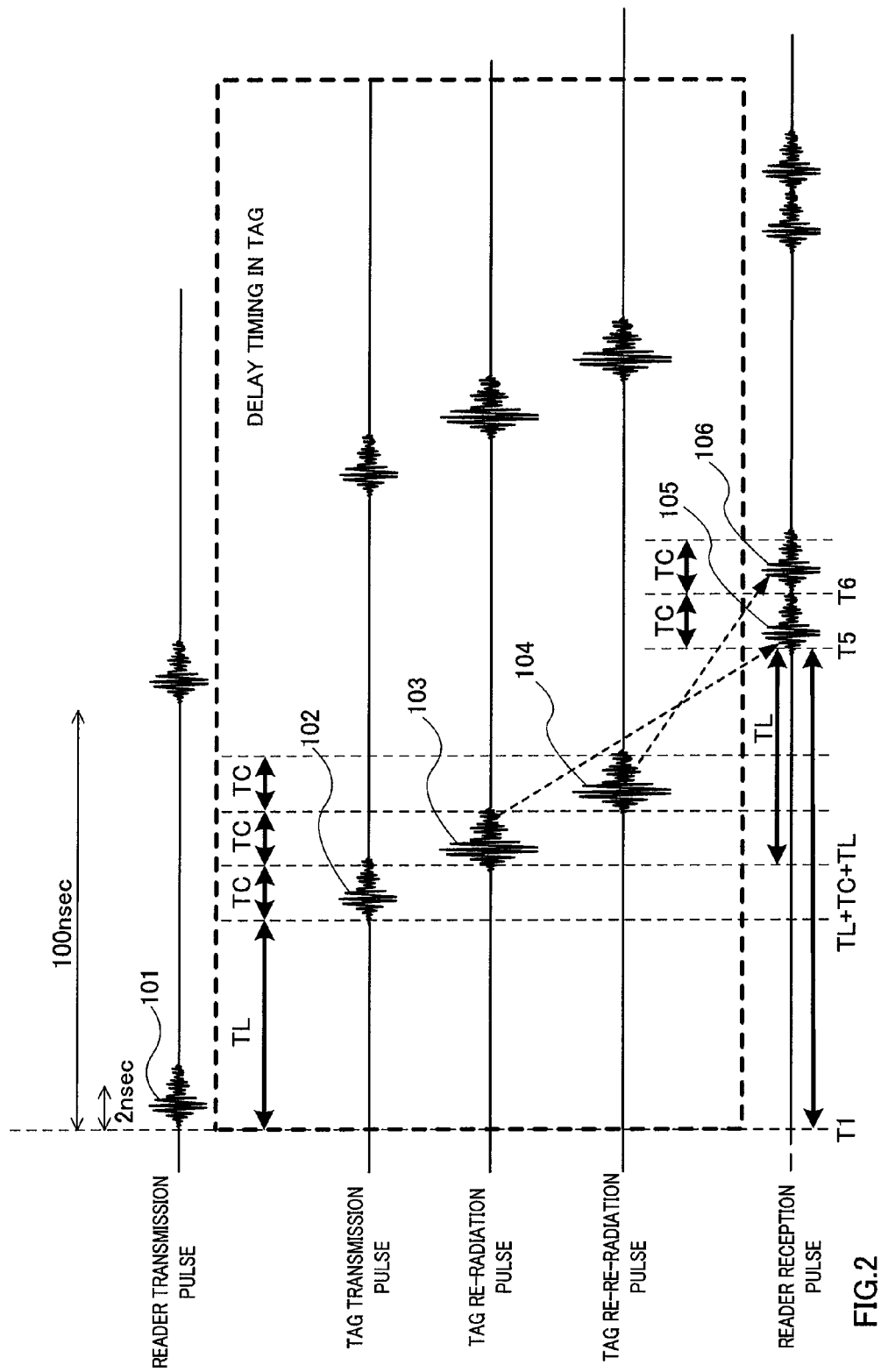
FIG. 2 shows a reader transmission pulse, and a re-radiation pulse and a re-re-radiation pulse corresponding to the reader transmission pulse.

FIG. 2 shows a UWB pulse transmitted from the reader (hereinafter referred to as "reader transmission pulse"), and a re-radiation pulse and a re-re-radiation pulse corresponding to the reader transmission pulse. In FIG. 2, the vertical axis indicates signal power and the horizontal axis indicates time.

Reader transmission pulse 101 sent out from the reader reaches the tag after spatial propagation time TL of a radio wave propagating the distance between the reader and the tag passes. In FIG. 2, tag reception pulse 102 indicates reader transmission pulse 101 that reached the tag. The tag receives tag reception pulse 102 at a reception antenna. As described above, tag reception pulse 102 is transmitted as tag re-radiation pulse 103 from the transmission antenna of the tag to the reader via the inner circuit of the tag.

Here, circuit delay time in which tag reception pulse 102 is received by the tag and is transmitted as tag re-radiation pulse 103 is set as TC.

After tag re-radiation pulse 103 is radiated from the transmission antenna of the tag, part of the power enters the reception antenna of the tag. Then, after circuit delay time TC of the tag passes, tag re-radiation pulse 103 is radiated as tag re-re-radiated pulse 104 from the transmission antenna of the tag.

Tag re-radiation pulse 103 and tag re-re-radiation pulse 104 sent out from the tag reach the tag after spatial propagation time TL of a radio wave propagating the distance between the reader and the tag passes. Reader reception pulses 105 and 106 indicate tag re-radiation pulse 103 and tag re-re-radiation pulse 104 that reach the reader. The reader receives reader reception pulses 105 and 106 at the reception antenna.

The reader can observe the following times from the transmission timing of reader transmission pulse 101 and the reception timings of reader reception pulses 105 and 106.

(a) Time difference between heading time T1 of reader transmission pulse 101 and heading time T5 of reader reception pulse 105 (T5−T1=TL+TC+TL) (b) Time difference between heading time T5 of reader reception pulse 105 corresponding to tag re-radiation pulse 103 and heading time T6 of reader reception pulse 106 corresponding to tag re-re-radiation pulse 104 (T6−T5=TC)

Here, as expected from the form of the tag, the distance between the transmission antenna of the tag and the reception antenna of the tag is short enough to be ignored compared to circuit delay time of the tag. Therefore, the circuit delay time is above-described time difference TC between the reception timing of reader reception pulse 105 and the reception timing of reader reception pulse 106.

The reader can measure spatial propagation time TL between the reader and the tag that does not include circuit delay time TC in the tag, by ((TL+TC+TL)−TC)/2=TL, from two observation times of (a) and (b). As described above, the tag transmits a re-radiation pulse and a re-re-radiation pulse, and the reader observes the arrival time (reception timing) of the re-radiation pulse and the re-re-radiation pulse. By this means, the reader can measure circuit delay time in the tag, and consequently can measure spatial propagation time not including the circuit delay time. Once the spatial propagation time is obtained, the reader can determine the distance between the reader and the tag by multiplying the spatial propagation time by the spatial propagation speed.

As described above, according to the present embodiment, the actual distance between a reader and a tag is calculated from actual spatial propagation time from which circuit delay time in the tag is removed, between the reader and the tag. Configurations of a base station and a terminal according to the present embodiment will be described below.

[Configuration of Base Station]

Figure 3:
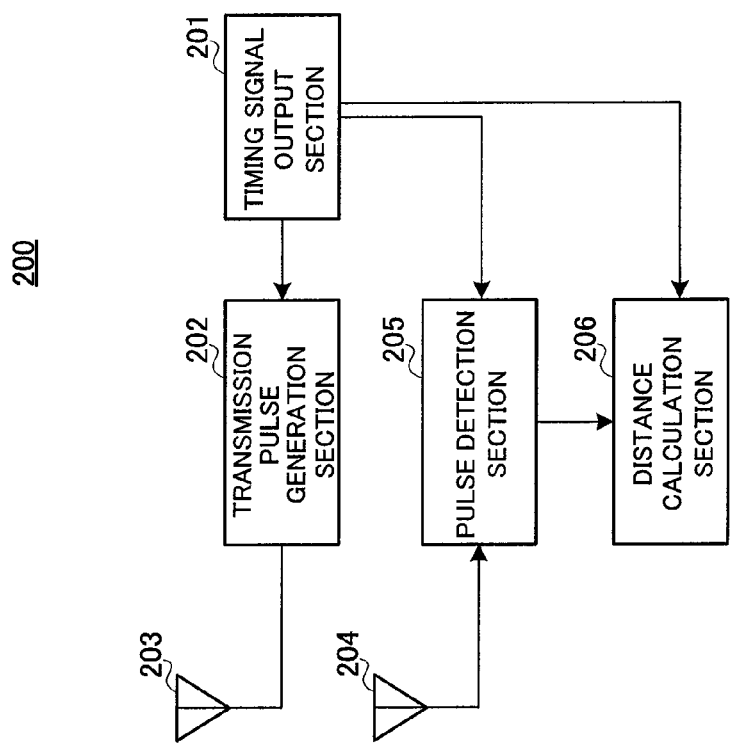
FIG. 3 is a block diagram showing a configuration of a base station according to Embodiment 1.

FIG. 3 is a block diagram showing a configuration of base station 200 of a radio distance measurement system according to the present embodiment of the present invention. Examples of base station 200 include a reading apparatus (reader) for performing UWB communication.

In FIG. 3, base station 200 includes timing signal output section 201, transmission pulse generation section 202, transmission antenna 203, reception antenna 204, pulse detection section 205, and distance calculation section 206.

Timing signal output section 201 generates clock signals at equal time intervals. Specifically, timing signal output section 201 generates two kinds of clock signals of a long-period clock signal and a short-period clock signal. The period of a long-period clock signal is determined depending on the measurement range. For example, when the maximum value of the measurement distance is 15 m, the round-trip propagation distance of a radio wave is 30 m, and the maximum delay wave is 100 nanoseconds. Further, the period of a short-period clock signal corresponds to distance measurement resolution, and is usually set as the equivalent value to the width of a UWB pulse. One nanosecond corresponds to distance measurement resolution of 30 cm. The generated clock signal is output to transmission pulse generation section 202, pulse detection section 205, and distance calculation section 206.

Transmission pulse generation section 202 generates a pulse signal based on the long-period clock signal from timing signal output section 201. Transmission pulse generation section 202 includes a amplification circuit for performing drive amplification based on the long-period clock signal, and a bandpass filter. For the amplification circuit, a step recovery diode is used, for example. In this case, in transmission pulse generation section 202, a step recovery diode is driven (i.e. edge shock driven) at one of the leading edge or the trailing edge of a long-term clock signal so that current is amplified, and then a bandpass filter performs band limitation on the obtained signal. By this means, a pulse signal having a pulse width of about one nanosecond (i.e. pulse width as broad as the short period) is generated. As described above, a pulse signal is generated in the same period as the period of a long period clock signal, and is transmitted as a transmission pulse signal via transmission antenna 203.

Pulse detection section 205 receives the re-radiation pulse and the re-re-radiation pulse that are transmitted from terminal 300 (described later) via reception antenna 204. Pulse detection section 205 detects the re-radiation pulse and the re-re-radiation pulse by obtaining synchronization with a short-period clock signal, obtains the reception timings (arrival times) of the re-radiation pulse and the re-re-radiation pulse from the level of the obtained detection signal, and outputs information about the obtained reception timings to distance calculation section 206.

Distance calculation section 206 calculates the actual spatial propagation time required while a radio wave propagates between base station 200 and terminal 300 (described later). Specifically, distance calculation section 206 calculates spatial propagation time according to the procedures described in [Overview of Radio Distance Measurement System] above, from the transmission timing of a transmission pulse that is obtained in timing signal output section 201 and the arrival time difference between a re-radiation pulse and a re-re-radiation pulse that arrive from terminal 300. Then, distance calculation section 206 calculates the distance between base station 200 and terminal 300 by multiplying spatial propagation time by the traveling speed of a radio wave.

[Configuration of Terminal]

Figure 4:
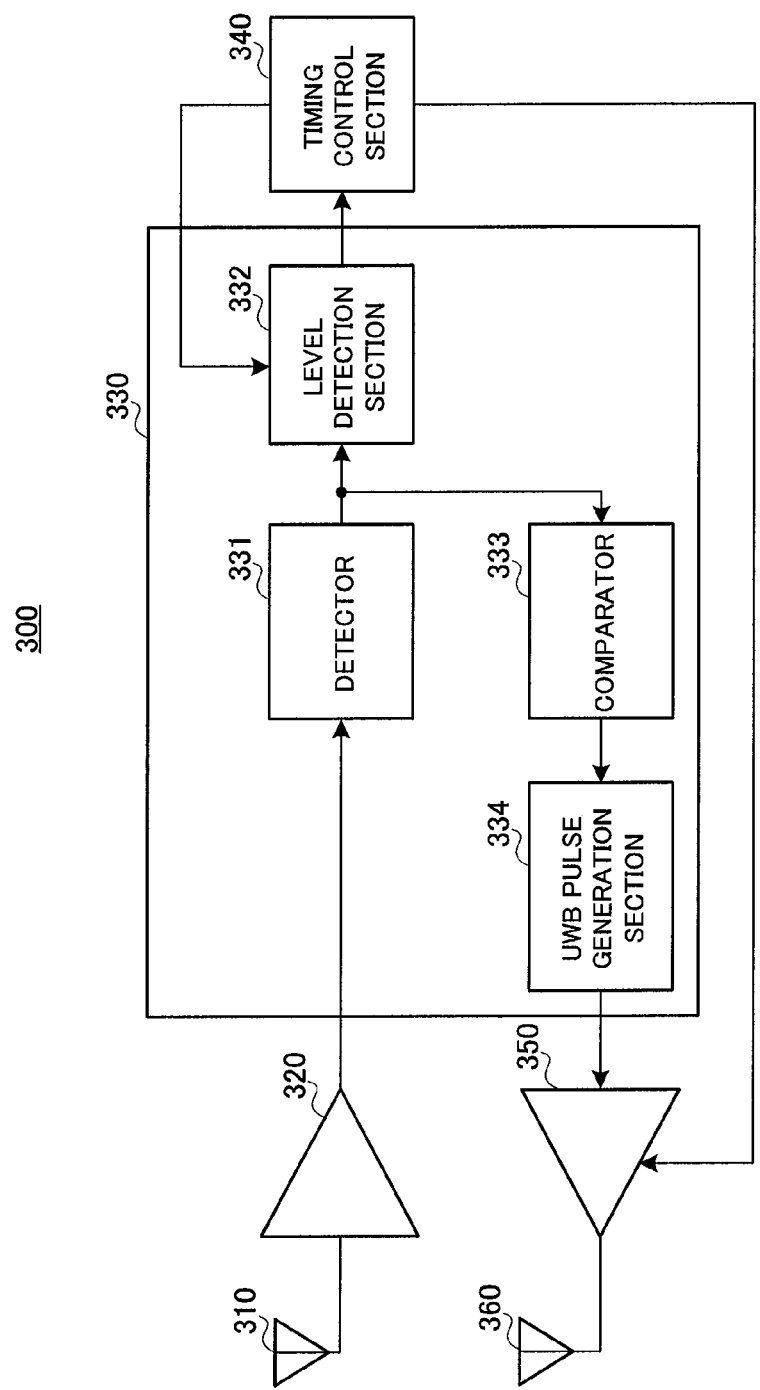
FIG. 4 is a block diagram showing a configuration of a terminal according to Embodiment 1.

FIG. 4 is a block diagram showing a configuration of terminal 300 of a radio distance measurement system according to the present embodiment of the present invention. Terminal 300 is a tag for performing UWB communication, for example.

In FIG. 4, terminal 300 includes reception antenna 310, reception amplifier 320, tag transreceiver circuit 330, timing control section 340, transmission amplifier 350, and transmission antenna 360.

Reception amplifier 320 amplifies the reception pulse signal received via reception antenna 310, and outputs the amplified reception pulse signal to tag transreceiver circuit 330.

FIG. 4 shows an example of an internal configuration of tag transreceiver circuit 330. Tag transreceiver circuit 330 shown in FIG. 4 is an example of a configuration when the semi-passive method is adopted, and tag transreceiver circuit 330 includes detector 331, level detection section 332, comparator 333, and UWB pulse generation section 334.

Detector 331 detects a reception pulse signal from reception amplifier 320. Detector 331 is configured with, for example, a rectifier circuit using a diode and a condenser, and is subject to envelope detection of the reception pulse signal from reception amplifier 320. For example, when the reception pulse signal is an on-off keying (OOK) modulated signal of the impulse method UWB, the result of the detection obtained in detector 331 is a baseband signal of about one to two nanoseconds. The detection result obtained in detector 331 is output to level detection section 332.

Level detection section 332 samples the detection result from detector 331 according to the output timing from timing control section 340, and detects the level of a baseband signal. Level detection section 332 outputs information about the level of the detected baseband signal to timing control section 340.

Comparator 333 receives as input the detection result of detector 331, generates a binarized digital signal according to the comparison of which one of the comparison reference voltage and the detection result is smaller or greater, and outputs the generated digital signal to UWB pulse generation section 334. For example, when the input detection result is equal to or exceeds the comparison reference voltage, comparator 333 outputs a high-level signal. On the other hand, when the input detection result falls below the comparison reference voltage, comparator 333 outputs a low-level signal.

UWB pulse generation section 334 generates a transmission pulse signal corresponding to the output signal from comparator 333, using the power supplied from a power source (not shown) provided in terminal 300, and outputs the generated transmission pulse signal to transmission amplifier 350. As UWB pulse generation section 334, it is possible to use a step recovery diode or an amplifier for which the band is limited.

Timing control section 340 generates clock signals at predetermined equal time intervals usually having a width of about twice to twenty times as broad as the width of a UWB pulse, that are determined from the circuit delay mean time in the tag and, and outputs the clock signals to level detection section 332 by shifting the timing of the clock signals at predetermined intervals.

Further, timing control section 340 detects the timing in which the level of the base band signal detected in level detection section 332 is the greatest (hereinafter referred to as "detection timing"). Then, timing control section 340 generates an on/off control signal based on the detection timing, and outputs the generated on/off control signal to transmission amplifier 350. Details of the on/off control signal will be described later.

Transmission amplifier 350 performs an on/off operation based on the on/off control signal output from timing control section 340. During the period in which an on/off control signal is on, transmission amplifier 350 amplifies a transmission pulse signal output from UWB pulse generation section 334. The amplified transmission pulse signal is transmitted to base station 200 via transmission antenna 360. On the other hand, during the period in which an on/off control signal is off, transmission amplifier 350 stops the operation. Therefore, output of transmission amplifier 350 during the "off" period is no signal.

Figure 5:
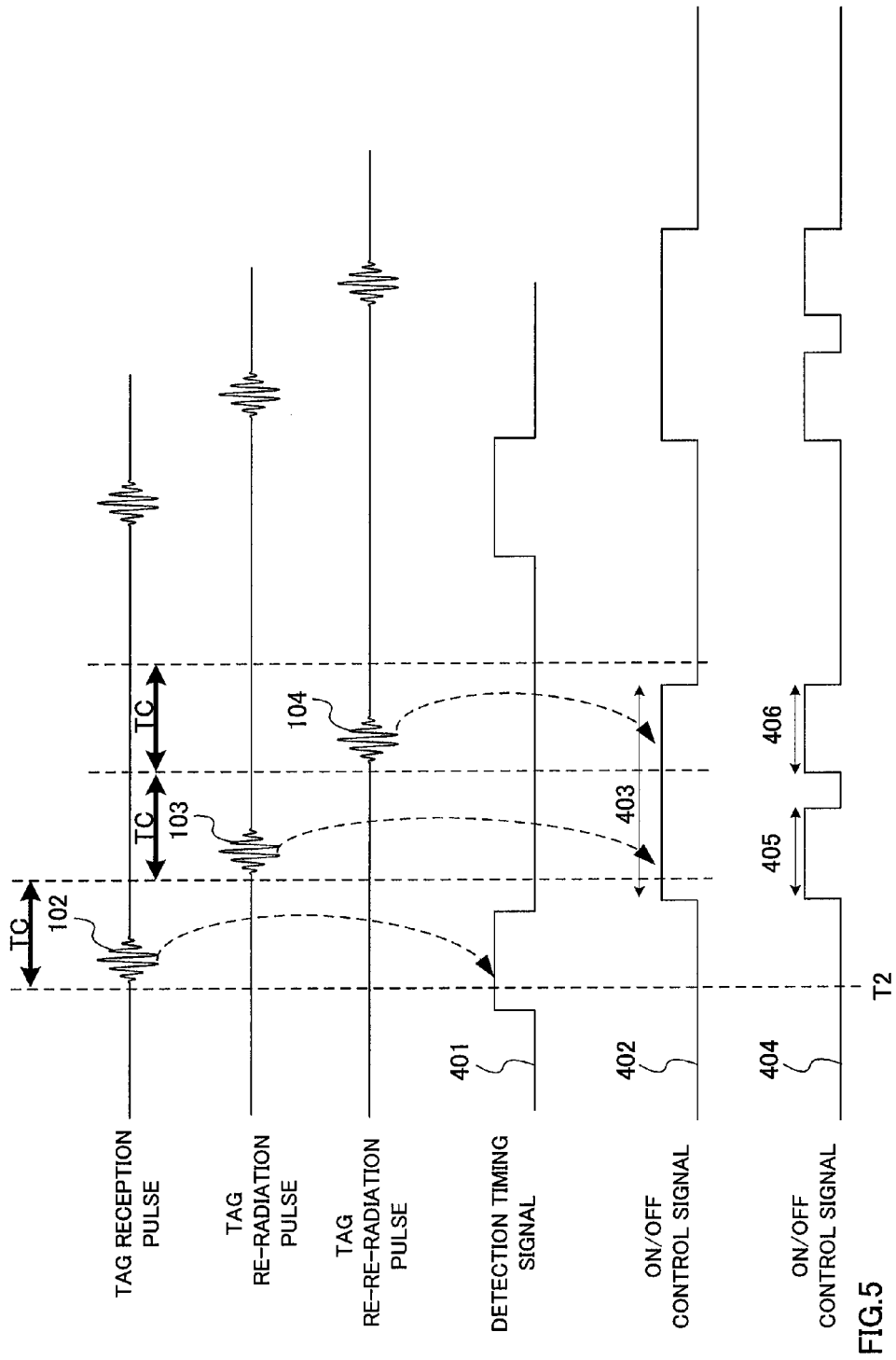
FIG. 5 shows on/off control signals according to Embodiment 1.

Next, an on/off control signal output from timing control section 340 will be described below. FIG. 5 shows examples of an on/off control signal. Further, in FIG. 5, the pulse signals that are the same as in FIG. 2 will be assigned the same reference numerals as in FIG. 2.

In FIG. 5, detection timing signal 401 is a clock signal output from timing control section 340.

A UWB pulse from base station 200 is amplified in reception amplifier 320 of terminal 300, and, as a result of the amplification, is detected in the clock signal output from timing control section 340, in detector 331.

As described above, timing control section 340 outputs a clock signal to level detection section 332 by shifting the output timing of the clock signal that is to be output to level detection section 332, at predetermined intervals, so that the result of level detection in level detection section 332 is the greatest.

When the time in which the clock signal output from timing control section 340 arrives and the time in which tag reception pulse 102 arrives are different, level detection section 332 detects the level at the timing in which there is no tag reception pulse 102, so that the result of the level detection is 0 or a noise level. In this case, timing control section 340 outputs a clock signal to level detection section 332, by shifting the output timing of the clock signal at predetermined intervals. By this means, it is possible to obtain rough synchronization with respect to tag reception pulse 102.

In FIG. 5, detection timing signal 401 shows the output timing of the clock signal in which the result of level detection in level detection section 332 is the greatest. An example shown in FIG. 5 indicates the condition where the time in which tag reception pulse 102 arrives and the period in which detection timing signal 401 is a high level are almost synchronized and rough synchronization is obtained.

As described above, timing control section 340 generates an on/off control signal for transmission amplifier 350, based on the detection timing in which the result of level detection is the greatest, at the phase in which rough synchronization with tag reception pulse 102 is obtained. Specifically, timing control section 340 generates an on/off control signal that becomes a high level when a predetermined time passes after the detection timing in which rough synchronization with tag reception pulse 102 is obtained. At this time, the predetermined time is, for example, the smallest value of circuit delay time of terminal 300 or shorter. By this means, transmission amplifier 350 is turned on at the heading timing of the period in which tag re-radiation pulse 103 corresponding to tag reception pulse 102 is output from tag transreceiver circuit 330 (re-radiation pulse output period), so that tag re-radiation pulse 103 is transmitted from transmission antenna 360.

In FIG. 5, on/off control signal 402 is a signal that becomes a high level during the period (403) from the timing immediately before the period in which tag reception pulse 102 is output from tag transreceiver circuit 330 via the inner circuit as tag re-radiation pulse 103 (re-radiation pulse output period), to the period in which tag re-re-radiation pulse 104 is output from tag transreceiver circuit 330 (re-re-radiation pulse output period). An on/off control signal shown in FIG. 5 is a signal for which the period (403) in which an on/off control signal becomes a high level is twice the smallest value of circuit delay time or greater and is smaller than three times the smallest value of the circuit delay time. Transmission amplifier 350 sets the period in which on/off control signal 402 is a high level as the "on" period. Therefore, in the period in which tag re-radiation pulse 103 and tag re-re-radiation pulse 104 are output from tag transreceiver circuit 330, transmission amplifier 350 is already turned on, so that tag re-radiation pulse 103 and tag re-re-radiation pulse 104 will be amplified by transmission amplifier 350 and is transmitted from transmission antenna 360.

Further, in FIG. 5, on/off control signal 404 is a signal that becomes a high level during the period in which tag re-radiation pulse 103 is output (re-radiation pulse output period) and the period in which tag re-re-radiation pulse 104 is output (re-re-radiation pulse output period).

As is clear from FIG. 5, on/off control signal 404 has shorter "on" period (periods 405 and 406 in which on/off control signal 404 becomes a high level), compared to on/off control signal 402. Therefore, when using on/off control signal 404, compared to the case of using on/off control signal 402, it is possible to reduce power consumption.

Further, tag re-re-radiation pulse 104 is a pulse that is sent out after tag re-radiation pulse 103 travels in the inner circuit of terminal 300 one more time, and the circuit delay time is shorter than the tag reception pulse interval. Therefore, it is possible to set the period in which transmission amplifier 350 is turned on shorter than the reader transmission pulse interval (or the tag reception pulse interval). That is, the period in which an on/off control signal becomes a high level is shorter than the reader transmission pulse interval (or the tag reception pulse interval).

Further, the periods in which detection timing signal 401 and on/off control signals 402 and 404 become a high level have a broader time interval to some extent compared to the width of a UWB pulse. For example, when the width of a UWB pulse is one to two nanoseconds, the period in which a signal becomes a high level has a width of about four to twenty nanoseconds. By this means, it is possible to prevent detection timing signal 401 and on/off control signals 402 and 404 from being out of synchronization with a UWB pulse due to the change of temperature, for example.

As described above, it is possible to uniquely set the timings and periods 403, and 405 and 406 in which on/off control signals 402 and 404, respectively, become a high level from detection timing signal 401, based on the representative value of circuit delay time of terminal 300 (for example, minimum time and mean time).

By this means, during the period in which tag re-radiation pulse 103 and tag re-re-radiation pulse 104 are output (re-radiation pulse output period and re-re-radiation pulse output period), timing control section 340 outputs an on/off control signal that turns on transmission amplifier 350, to transmission amplifier 350.

By this means, a re-radiation pulse and a re-re-radiation pulse are transmitted from terminal 300. Then, after circuit delay time of terminal 300, which is required while terminal 300 receives a re-radiation pulse and then transmits re-re-radiation pulse that is generated according to a detection signal of that re-radiation pulse, a re-re-radiation pulse will be transmitted. As a result of this, base station 200 can calculate circuit delay time of terminal 300 from the time difference between the reception timing of a re-radiation pulse and the reception timing of a re-re-radiation pulse. As a result of this, base station 200 can correct the individual difference, variation due to years, and variation due to time of terminals 300, making it possible to accurately measure the distance between base station 200 and terminal 300.

As described above, according to the present embodiment, timing control section 340 transmits a control signal based on the reception timing of the pulse signal transmitted from base station 200, and based on the representative value of circuit delay time required while a reception pulse signal is received and then a transmission pulse signal that is generated according to a detection signal of that reception pulse signal is transmitted, to transmission amplifier 350. Specifically, timing control section 340 outputs a control signal that controls transmission amplifier 350 on and off so as to amplify a re-radiation pulse generated according to a detection signal of the pulse signal transmitted from base station 200 and a re-re-radiation pulse generated according to a detection signal of that re-radiation pulse, to transmission amplifier 350. That is, during the re-radiation pulse output period and the re-re-radiation pulse output period, timing control section 340 outputs the on/off control signal that turns on transmission amplifier 350.

By this means, from terminal 300, a re-radiation pulse is transmitted as a response UWB signal corresponding to the transmission pulse signal transmitted from base station 200, and a re-re-radiation pulse is transmitted as a response UWB signal corresponding to that re-transmission pulse signal. Then, base station 200 can obtain circuit delay time of terminal 300 by measuring the difference between the reception timing of the re-radiation pulse and the reception timing of the re-re-radiation pulse. By this means, base station 200 can obtain spatial propagation time between base station 200 and terminal 300 that is corrected by the amount of the circuit delay time of terminal 300, with high accuracy of measurement. As a result of this, it is possible to improve the accuracy of measurement of the distance between base station 200 and terminal 300.

(Embodiment 2)

As described above, it is possible to measure the distance between the reader and the tag by transmitting a UWB pulse in a certain period from the reader. By the way, in pulse communication, it is possible to transmit data at the same time by the on-off-keying (OOK) modulation for transmitting and not transmitting a pulse at the timing of a certain period. That is, in UWB pulse communication, it is possible to transmit data by turning a UWB pulse on and off according to data, at the reader side. Using this data transmission, the reader can report a mode switch signal for switching the operational mode of the tag to either the normal operational mode or the circuit calibration mode. Here, the normal operational mode is a mode for measuring the distance between the tag and the reader by sending out only a re-radiation pulse from the tag. Further, the circuit calibration mode is a mode for measuring and correcting circuit delay time of the tag by sending out a re-radiation pulse and a re-re-radiation pulse from the tag.

[Configuration of Base Station]

Figure 6:
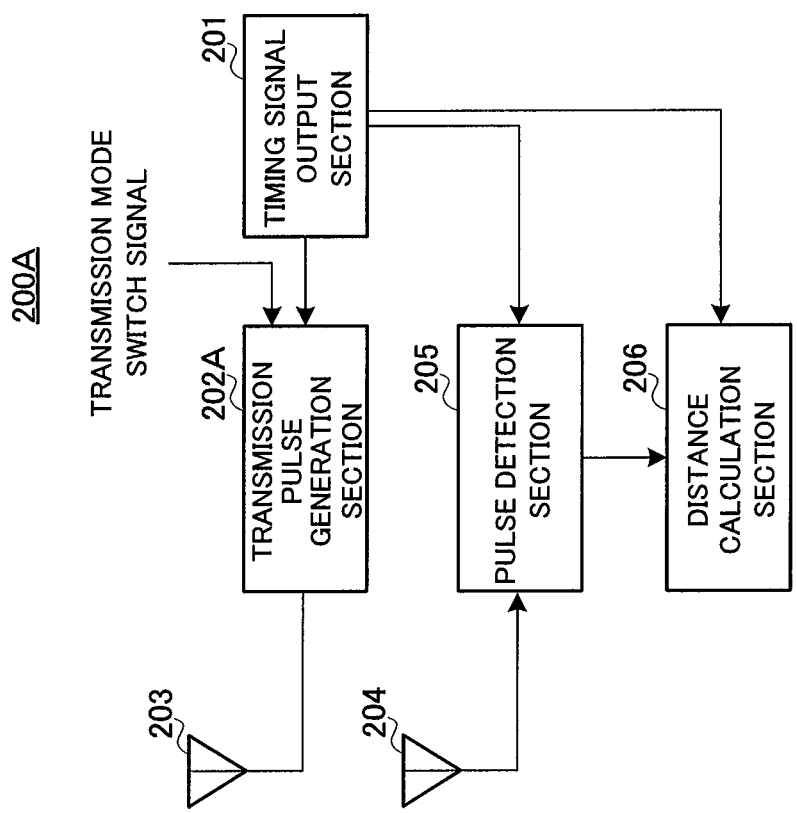
FIG. 6 is a block diagram showing a configuration of a base station according to Embodiment 2 of the present invention.

FIG. 6 shows a configuration of a base station according to Embodiment 2 of the present invention. In the base station according to the present embodiment in FIG. 6, parts that are the same as in FIG. 3 will be assigned the same reference numerals as in FIG. 3 and overlapping explanations will be omitted. Compared to base station 200 shown in FIG. 3, base station 200A shown in FIG. 6 includes transmission pulse generation section 202A instead of transmission pulse generation section 202.

Transmission pulse generation section 202A receives as input a transmission mode switch signal, and generates a pulse signal sequence corresponding to the transmission mode switch signal. When the transmission mode switch signal indicates the normal operational mode, transmission pulse generation section 202A generates "0110," for example, as a pulse signal sequence representing the normal operational mode. When the transmission mode switch signal indicates the circuit calibration mode, transmission pulse generation section 202A generates "1001," for example, as a pulse signal sequence representing the circuit calibration mode.

[Configuration of Terminal]

Figure 7:
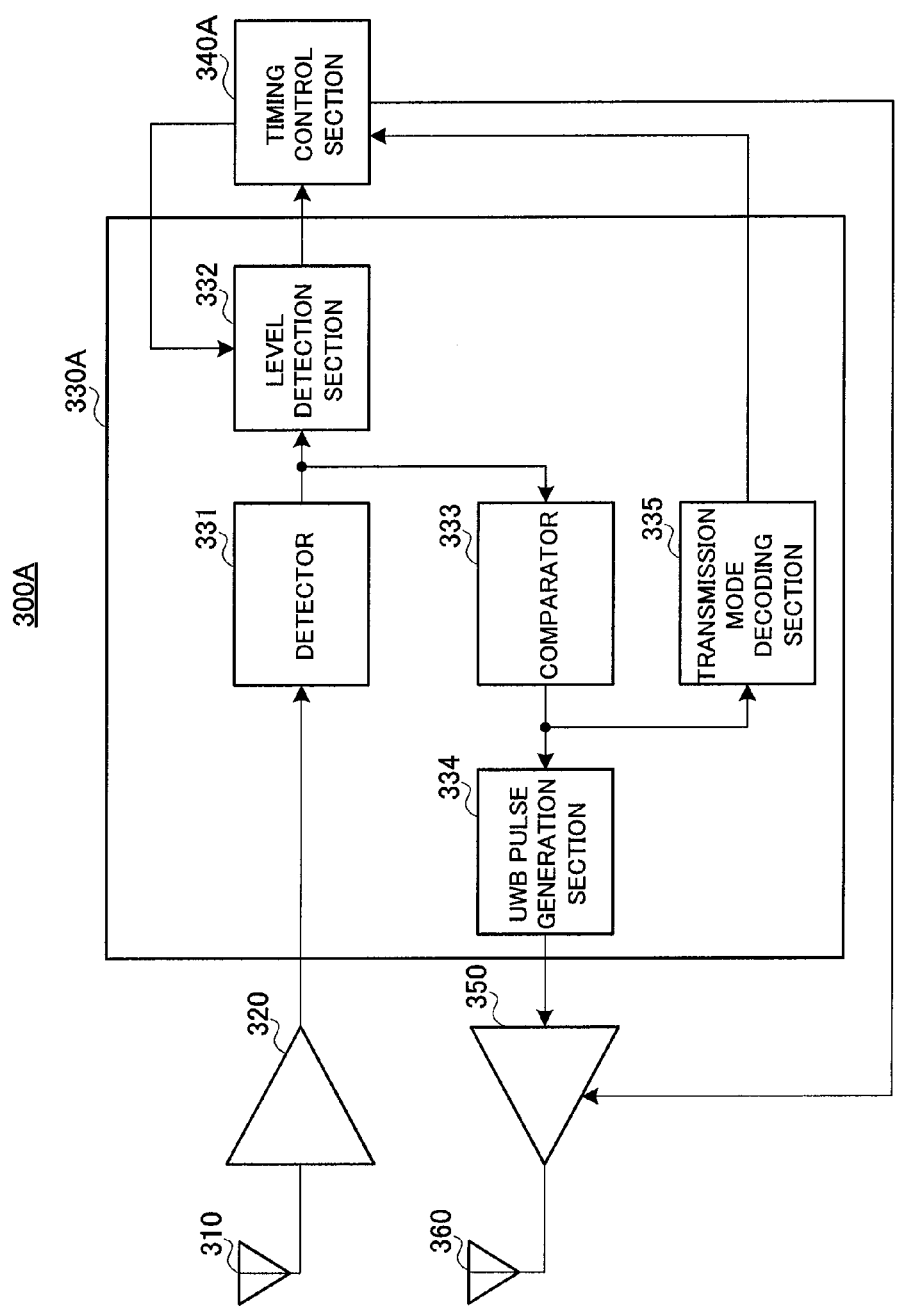
FIG. 7 is a block diagram showing a configuration of a terminal according to Embodiment 2.

FIG. 7 shows a configuration of a terminal according to Embodiment 2 of the present invention. In the terminal according to the present embodiment in FIG. 7, parts that are the same as in FIG. 4 will be assigned the same reference numerals as in FIG. 4 and overlapping explanations will be omitted. Compared to terminal 300 shown in FIG. 4, terminal 300A shown in FIG. 7 includes tag transreceiver circuit 330A and timing control section 340A instead of tag transreceiver circuit 330 and timing control section 340. Compared to tag transreceiver circuit 330, tag transreceiver circuit 330A is configured to add transmission mode decoding section 335.

Transmission mode decoding section 335 extracts a transmission mode switch signal from a digital signal binarized by comparator 333, and identifies whether the request from base station 200A is either the normal operational mode or the circuit calibration mode. Transmission mode decoding section 335 outputs the identification result about the transmission mode to timing control section 340A.

Timing control section 340A generates an on/off control signal corresponding to the identification result about the transmission mode, and outputs the generated on/off control signal to transmission amplifier 350. The on/off control signal output from timing control section 340A will be described below with reference to FIG. 8.

Figure 8:
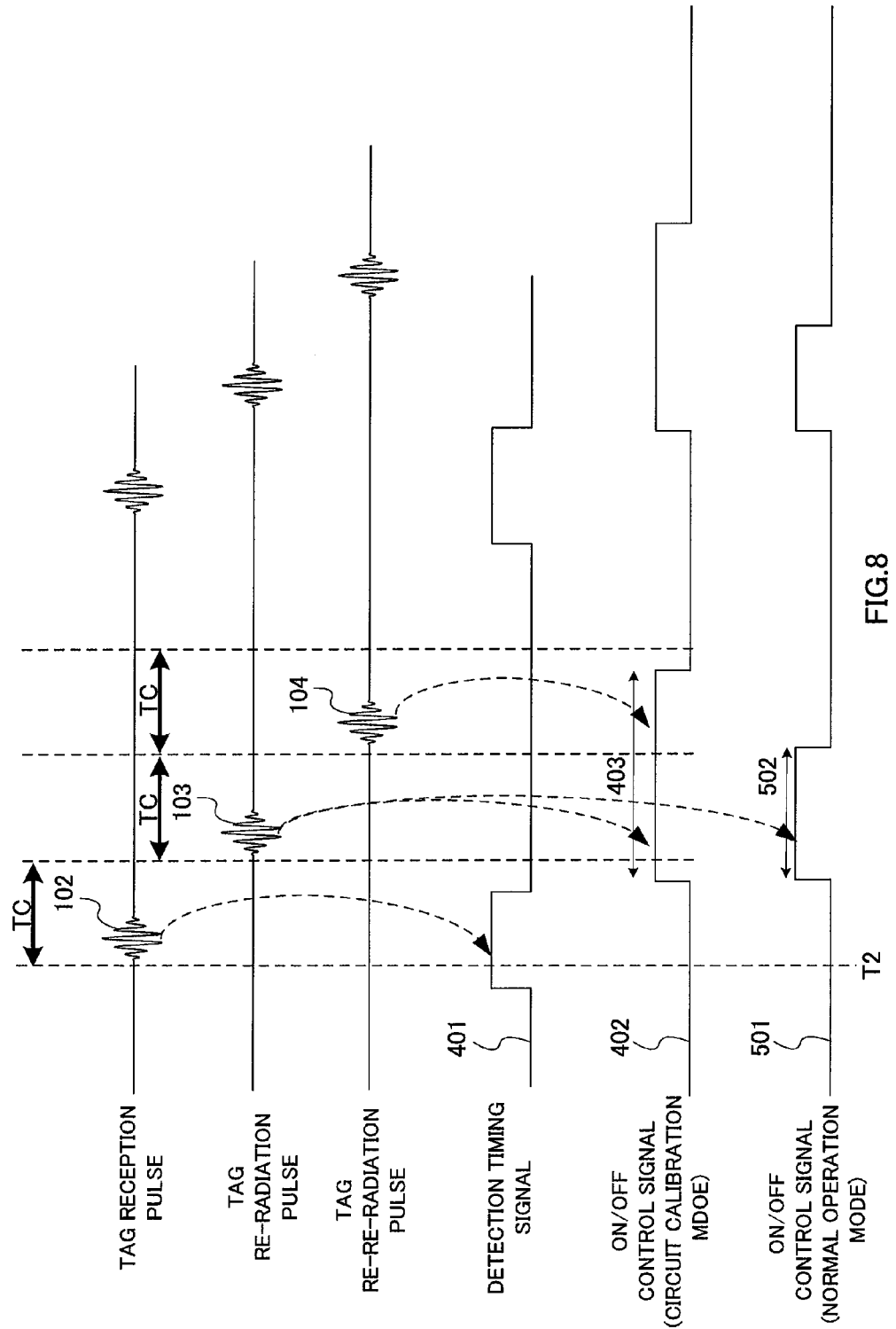
FIG. 8 shows on/off control signals according to Embodiment 2.

FIG. 8 shows examples of an on/off control signal. Pulse signals in FIG. 8 that are the same as in FIG. 5 are assigned the same reference numerals as in FIG. 5. As described above, during the period in which these on/off control signals become a high level, transmission amplifier 350 is turned on.

In FIG. 8, on/off control signal 402 is an on/off control signal in the circuit calibration mode. On/off control signal 402 is a high level during the period (403) from the timing immediately before the period in which tag reception pulse 102 is output as tag re-radiation pulse 103, from tag transreceiver circuit 330A via the inner circuit of terminal 300A (re-radiation pulse output period) until the period in which tag re-re-radiation pulse 104 is output from tag transreceiver circuit 330A (re-re-radiation pulse output period).

On the other hand, on/off control signal 501 is an on/off control signal in the normal operational mode. On/off control signal 501 is a high level during the period (502) from the timing immediately before the period in which tag reception pulse 102 is output as tag re-radiation pulse 103, from tag transreceiver circuit 330A via the inner circuit of terminal 300A (re-radiation pulse output period) until the period in which tag re-radiation pulse 103 is output from tag transreceiver circuit 330A (re-radiation pulse output period).

By this means, when the normal operational mode is reported as a transmission mode from base station 200A, only during the period in which tag re-radiation pulse 103 is output (re-radiation pulse output period), timing control section 340A outputs an on/off control signal with which transmission amplifier 350 is turned on, to transmission amplifier 350. By this means, tag re-re-radiation pulse 104 is not sent out in the mode apart from the circuit calibration mode, reducing the unnecessary radiation of a radio wave from terminal 300A. As a result of this, in a system in which pulses propagate in a complex manner when there are a plurality of tags or in a multipath environment, it is possible to make circuit calibration easier and reduce power consumption by mode switching.

As described above, according to the present embodiment, terminal 300A includes transmission mode decoding section 335 that identifies between the circuit calibration mode for measuring the circuit delay time and the distance measurement mode for measuring the distance between base station 200A and terminal 300A, based on a transmission mode switch signal. Then, timing control section 340A outputs an on/off control signal with which amplifier 350 amplifies a re-radiation pulse and a re-re-radiation pulse, to transmission amplifier 350, in the circuit calibration mode. That is, during the re-radiation pulse output period and the re-re-radiation pulse output period, timing control section 340A outputs an on/off control signal that turns on transmission amplifier 350, in the circuit calibration mode. Further, timing control section 340A is configured to output an on/off control signal with which transmission amplifier 350 amplifies a re-radiation pulse, to transmission amplifier 350, in the normal operational mode.

By this means, even when circuit delay time of terminal 300A varies depending on, for example, increase of temperature, base station 200A, for example, regularly reports a transmission mode switch signal indicating the circuit calibration mode to terminal 300A, so that a re-radiation pulse and a re-re-radiation pulse are sent out from terminal 300A to base station 200A. As a result of this, base station 200A can obtain the circuit delay time of terminal 300A, making it possible to accurately measure the distance between base station 200A and terminal 300A. Further, in the period that can be regarded that circuit delay time does not vary, base station 200A reports the transmission mode switch signal indicating the normal operational mode to terminal 300A, so that a re-re-radiation pulse will not be transmitted from terminal 300A to base station 200A. As a result of this, unnecessary radiation of a radio wave is decreased, so that, in a system in which pulses propagate in a complex manner when there are a plurality of tags or in a multipath environment, it is possible to make circuit calibration easier and reduce power consumption by mode switching.

Further, base station 200A can report a transmission mode switch signal using a pulse signal sequence indicating either the circuit calibration mode or the normal operational mode, by turning a UWB pulse on or off. As described above, it is possible to generate a transmission mode switch signal using transmission pulse generation section 202A that generates a transmission pulse signal for distance measurement, making it possible to prevent addition of a new circuit for generating a transmission mode switch signal.

Further, as is the case with detection timing signal 401 and on/off control signals 402 and 404, the period in which on/off control signal 501 becomes a high level has a broader time interval to some extent compared to the width of a UWB pulse. By this means, it is possible to prevent on/off control signal 501 from being out of synchronization with a re-radiation pulse due to the change of temperature, for example.

Further, an on/off control signal in the circuit calibration mode is not limited to on/off control signal 402, and it is possible to use on/off control signal 404 of FIG. 5.

(Embodiment 3)

As described with Embodiment 1, circuit delay time in the tag is measured using a re-radiation pulse and a re-re-radiation pulse sent out from the tag. At this time, in a multipath environment, a case is expected where a re-radiation pulse reflects a neighboring reflector and cannot be distinguished from a re-re-radiation pulse. For this reason, a case will be described with the present embodiment where the reader estimates the arrival directions for pulses from all tags, identifies the pulse arriving in the shortest time (i.e. the front-end wave) as a re-radiation pulse, and identifies the pulse arriving from the same direction as that direction, as a re-re-radiation pulse.

[Configuration of Base Station]

Figure 9:
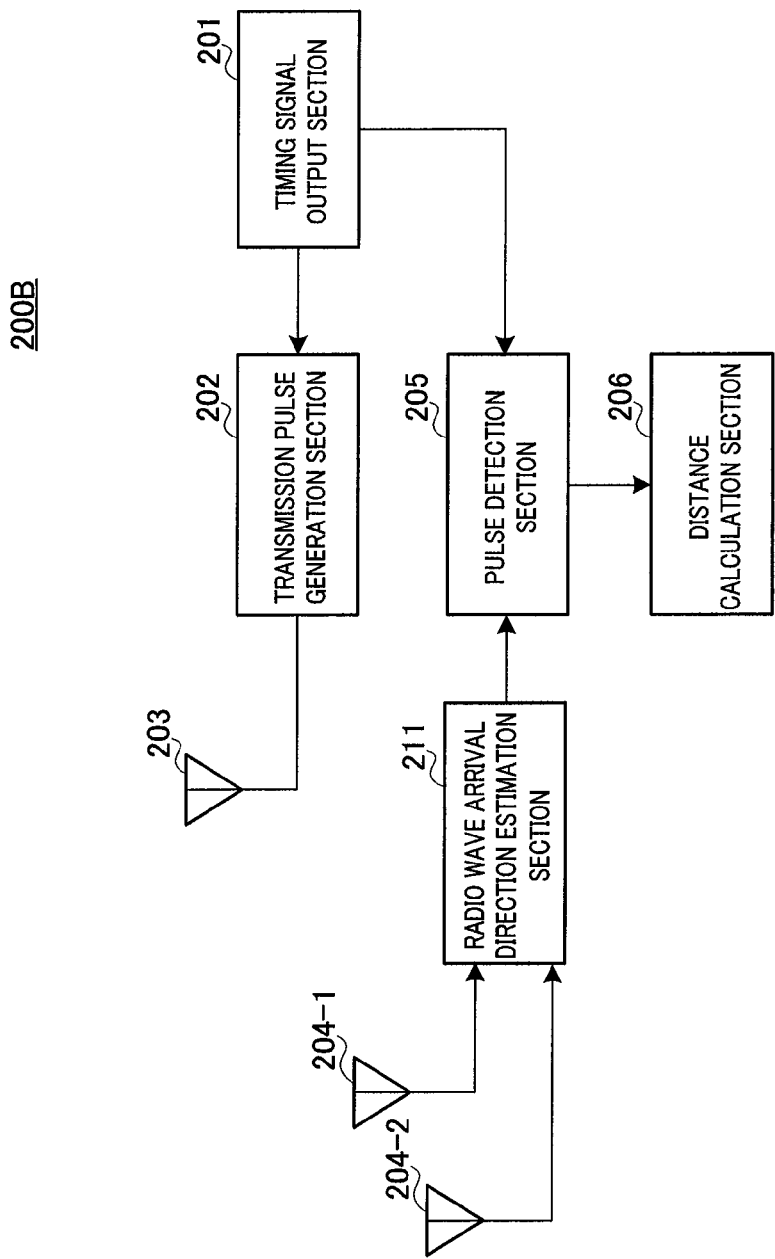
FIG. 9 is a block diagram showing a configuration of a base station according to Embodiment 3 of the present invention.

FIG. 9 is shows a configuration of a base station according to the present embodiment of the present invention. In the base station according to the present embodiment in FIG. 9, parts that are the same as in FIG. 3 will be assigned the same reference numerals as in FIG. 3 and overlapping explanations will be omitted. Compared to base station 200 shown in FIG. 3, base station 200B shown in FIG. 9 is configured to add radio wave arrival direction estimation section 211.

Radio wave arrival direction estimation section 211 estimates the arrival directions for all reception pulse signals transmitted from terminal 300. Especially, base station 200B having a plurality of antennas (array antenna), determines the arrival directions of receptions signals by applying an arrival direction estimation algorithm to a reception pulse signal group received at a plurality of antennas. As an arrival direction estimation algorism, it is possible to use a method of detecting the peak of the sum value by adding a reception pulse signal group received at a plurality of antennas by changing the phase of each reception pulse signal. Or, it is also possible to use the high-resolution estimation method for performing calculation using the eigen vector of a correlation matrix, such as the MUSIC or the ESPRIT as an arrival direction estimation algorism.

Then, radio wave arrival direction estimation section 211 identifies the pulse arriving in the shortest time (i.e. the front-end wave) as a re-radiation pulse, and identifies a pulse arriving from the same direction as that arrival direction, as a re-re-radiation pulse. Pulse detection section 205 detects the arrival times of the re-radiation pulse and the re-re-radiation pulse identified by radio wave arrival direction estimation section 211. Then, from the difference of arrival times between the re-radiation pulse and the re-re-radiation pulse, distance calculation section 206 calculates spatial propagation time required between base station 200B and terminal 300 and distance between base station 200B and terminal 300, according to the procedures described in [Overview of Radio Distance Measurement System] in Embodiment 1.

As described above, according to the present embodiment, base station 200B further includes radio wave arrival direction estimation section 211, and radio wave arrival direction estimation section 211 identifies the pulse arriving in the shortest time as a re-radiation pulse, and identifies a pulse arriving from the same direction as that arrival direction, as a re-re-radiation pulse. Then, distance calculation section 206 measures the circuit delay time of terminal 300 from the time difference of the reception timings between the re-radiation pulse and the re-re-radiation pulse arriving from the same direction. By this means, even when there are a plurality of tags, and there are multipath reflected waves at the same time, such as the cases where a plurality of pulses arrive and it is a multipath environment, base station 200B can extract a re-radiation pulse and a re-re-radiation pulse from those reception pulse signals being present at the same time. As a result of this, base station 200B can measure circuit delay time of terminal 300, making it possible to perform accurate distance measurement from which errors due to the circuit delay time are removed.

(Embodiment 4)

A case has been described with Embodiment 2 where a base station takes the lead to decide the transition to the circuit calibration mode, and the base station sends the report to that effect to a terminal. In the present embodiment, a terminal takes the lead to decide the transition to the circuit calibration mode.

According to the present embodiment, a terminal adds a different code sequence to each of a re-radiation pulse and a re-re-radiation pulse.

Figure 10:
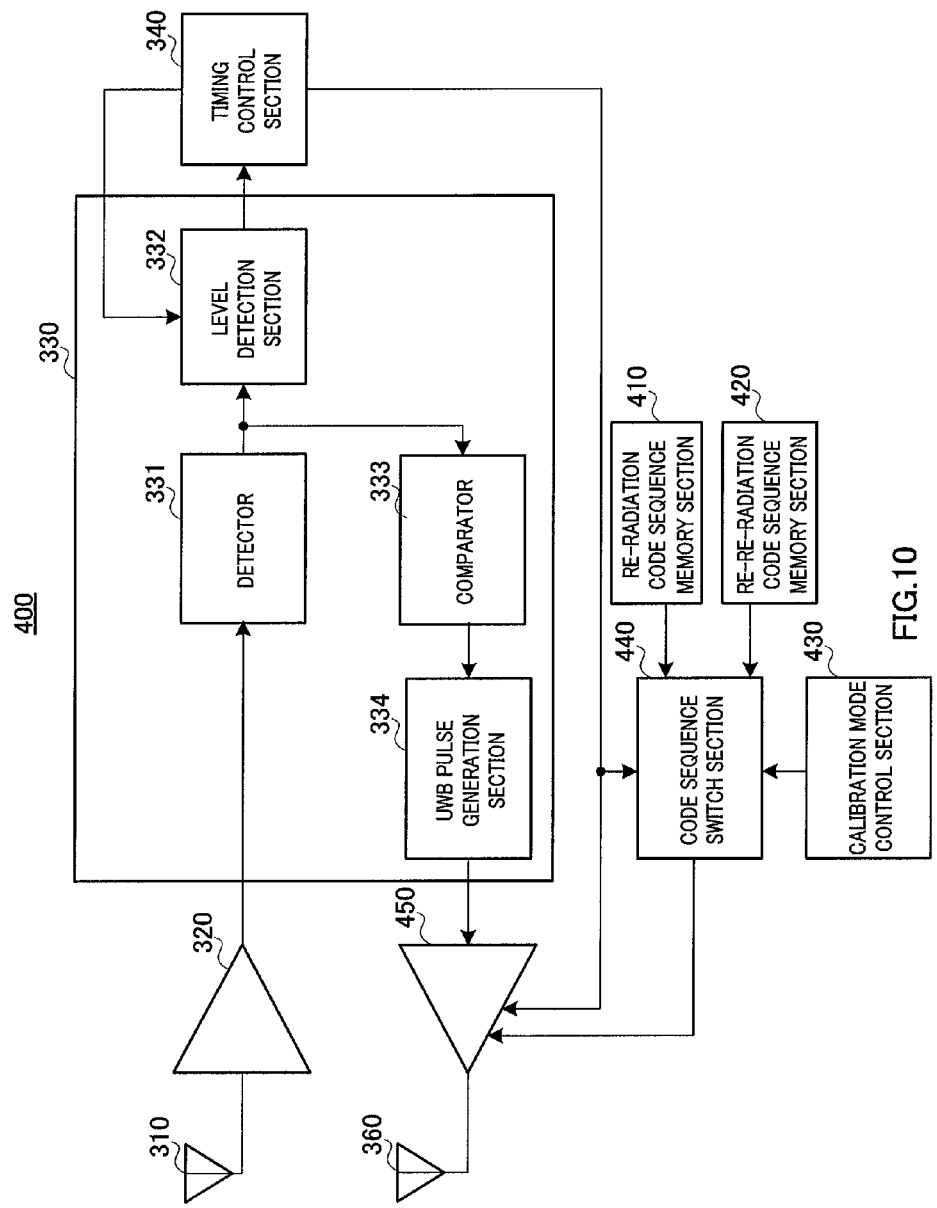
FIG. 10 is a block diagram showing a configuration of a terminal according to Embodiment 4 of the present invention.

FIG. 10 is a block diagram showing a configuration of a terminal according to the present embodiment of the present invention. Further, in the terminal according to the present embodiment in FIG. 10, parts that are the same as in FIG. 4 will be assigned the same reference numerals as in FIG. 4 and overlapping explanations will be omitted.

Re-radiation code sequence memory section 410 memorizes a code sequence to add to a re-radiation pulse to be transmitted from terminal 400 (code sequence for re-radiation). Re-radiation code sequence memory section 410 outputs the memorized code sequence to code sequence switch section 440.

Re-re-radiation code sequence memory section 420 memorizes a code sequence to add to a re-re-radiation pulse to be transmitted from terminal 400 (code sequence for re-re-radiation). Re-re-radiation code sequence memory section 420 outputs the memorized code sequence to code sequence switch section 440.

Here, a code sequence for re-radiation and a code sequence for re-re-radiation are different code sequences. These code sequences are switched for the re-radiation pulse output period and the re-re-radiation pulse output period in code sequence switch section 440 (described later), and are output to transmission amplifier 450.

Calibration mode control section 430 generates a control signal to transition to the circuit calibration mode. Circuit delay time of terminal 400 is caused by unevenness of the components used in the circuit or temperature characteristics, for example. Thus, by, for example, regularly changing the mode of terminal 400 to the circuit calibration mode, and measuring the circuit delay time by base station 500 (described later), even when the temperature changes, for example, it is possible to alleviate errors of distance measurement caused by variations of circuit delay time due to the change of temperature. Therefore, calibration mode control section 430 regularly outputs, for example, a control signal indicating transition to the circuit calibration mode, to code sequence switch section 440.

Code sequence switch section 440 receives as input an on/off control signal output from timing control section 340, a code sequence for re-radiation, a code sequence for re-re-radiation, and a control signal output from calibration mode control section 430. Upon receiving the control signal indicating transition to the circuit calibration mode, code sequence switch section 440 switches the code sequences to be added to a re-radiation pulse and a re-re-radiation pulse to respective addition code sequences that are different between a re-radiation pulse and a re-re-radiation pulse.

Specifically, code sequence switch section 440 generates a signal to differentiate the re-radiation pulse output period from the re-re-radiation pulse output period, using an on/off control signal. As shown in FIG. 5, an on-off control signal output from timing control section 340 is a signal that performs control so as to turn on transmission amplifier 450 during the period in which a re-radiation pulse is output to transmission amplifier 450 (re-radiation pulse output period) and the period in which a re-re-radiation pulse is output to transmission amplifier 450 (re-re-radiation pulse output period). For this reason, code sequence switch section 440 can generate a signal to differentiate between the re-radiation pulse output period and the re-re-radiation pulse output period, based on an on/off control signal.

Then, code sequence switch section 440 selects either of the code sequence for re-radiation or the code sequence for re-re-radiation, based on the generated signal. Specifically, code sequence switch section 440 selects the code sequence for re-radiation when the generated signal indicates the re-radiation pulse output period, and selects the code sequence for re-re-radiation when the generated signal indicates the re-re-radiation pulse output period. Code sequence switch section 440 outputs the selected code sequence to transmission amplifier 450.

By this means, code sequence switch section 440 changes code sequences to be added to a re-radiation pulse and a re-re-radiation pulse, and outputs the changed code sequences to transmission amplifier 450.

Transmission amplifier 450 performs an on/off operation based on the on/off control signal output from timing control section 340 and the code sequence output from code sequence switch section 440. Specifically, when the on/off control signal is in the "on" period, and when the code sequence is "1," transmission amplifier 450 amplifies the transmission pulse signal output from UWB pulse generation section 334. The amplified transmission pulse signal is transmitted to base station 500 via transmission antenna 360.

On the other hand, when an on/off control signal is in the "off" period, or when the code sequence is "0," transmission amplifier 450 stops the operation. Therefore, during the "off" period, or when a code sequence is "0," output of transmission amplifier 450 is no signal.

Figure 11:
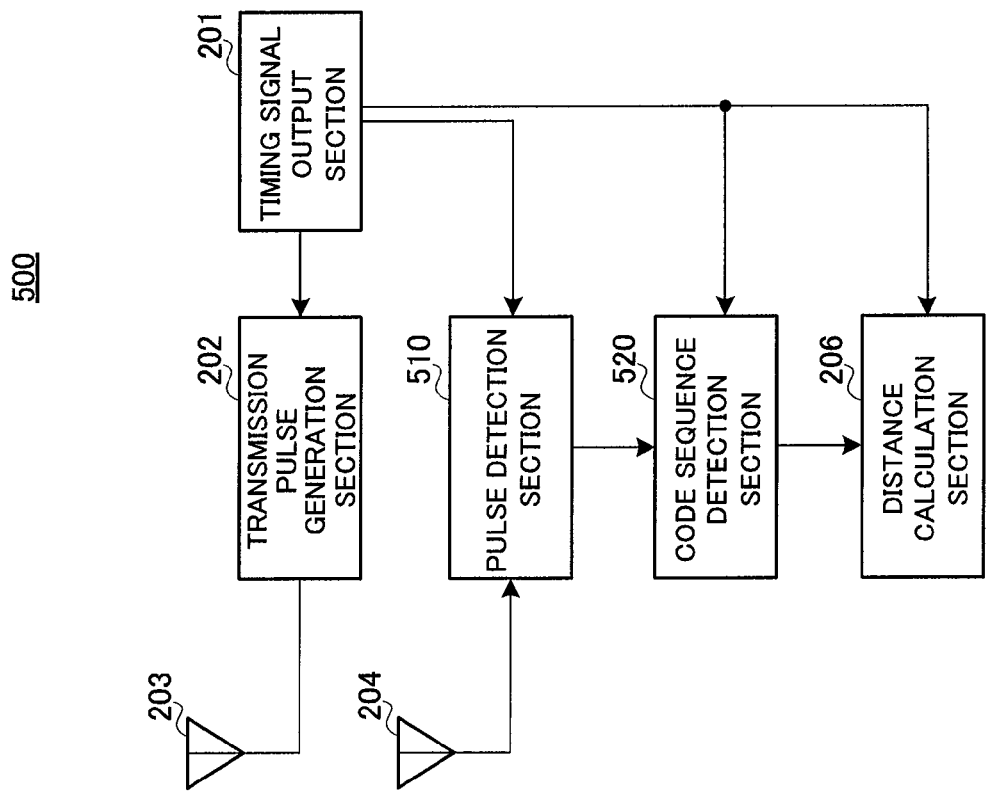
FIG. 11 is a block diagram showing a configuration of a base station according to Embodiment 4.

FIG. 11 is a block diagram showing a configuration of a base station according to the present embodiment of the present invention. Further, in base station 500 according to the present embodiment in FIG. 11, parts that are the same as in FIG. 3 will be assigned the same reference numerals as in FIG. 3 and overlapping explanations will be omitted.

Pulse detection section 510 receives a pulse (re-radiation pulse and re-re radiation pulse) transmitted from terminal 400 via reception antenna 204, and detects a reception pulse signal by detecting a pulse by performing synchronization with the short-period clock signal output from timing signal output section 201. Pulse detection section 510 outputs the detected reception pulse signal to code sequence detection section 520.

Code sequence detection section 520 detects a code sequence for re-radiation or a code sequence for re-re-radiation, from the reception pulse signal output from pulse detection section 510, using the long-term clock signal output from timing signal output section 201. A method of detecting codes in code sequence detection section 520 will be described later. Further, upon detecting a code sequence for re-radiation or a code sequence for re-re-radiation, code sequence detection section 520 outputs information about the reception timing of the reception pulse signal used for these detections, to distance calculation section 206.

Figure 12:
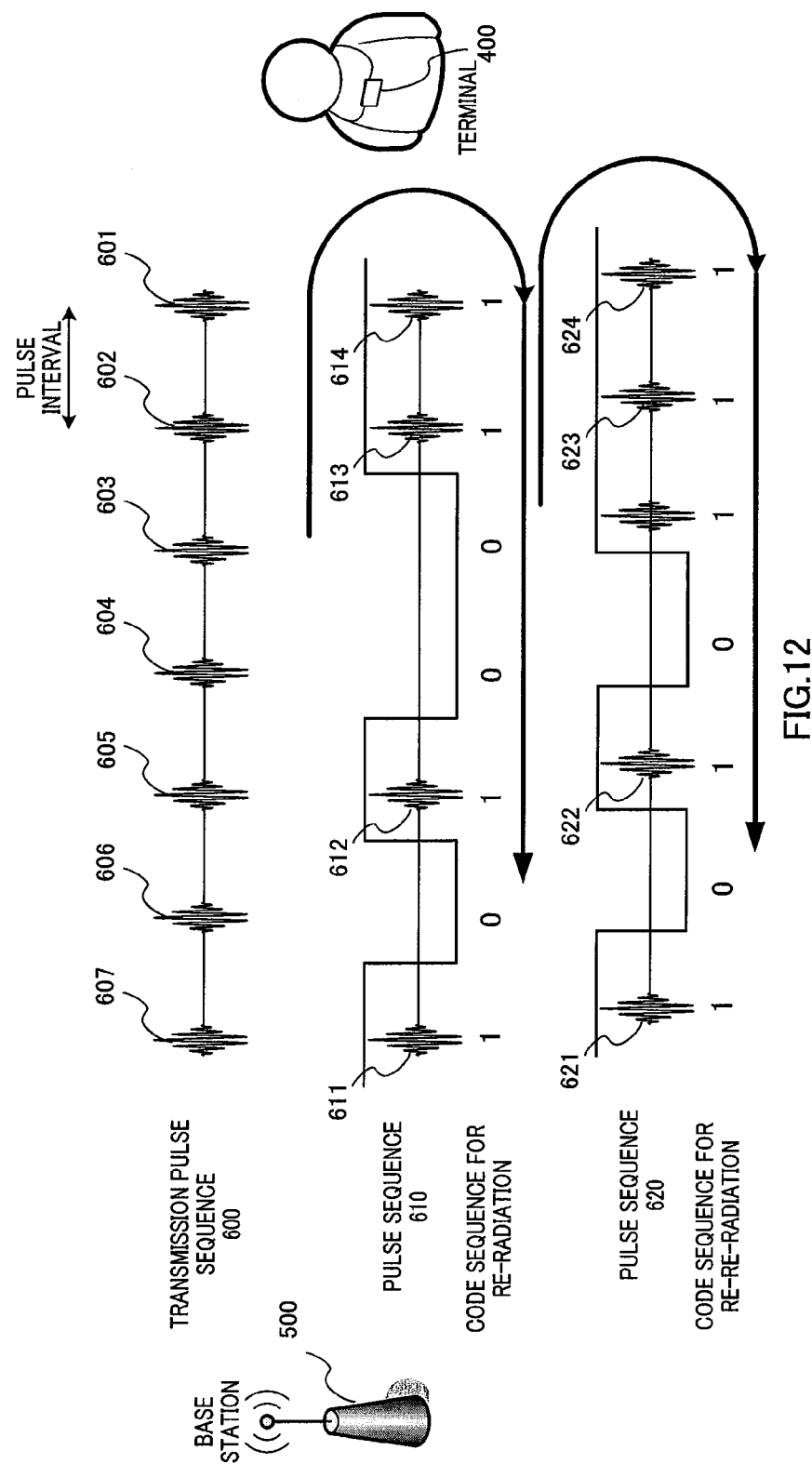
FIG. 12 shows examples of a pulse sequence received and transmitted between a base station and a terminal.

FIG. 12 shows examples of a pulse sequence received and transmitted between base station 500 and terminal 400.

Base station 500 generates a transmission pulse signal, which is a reference pulse signal, per period of the long-period clock signal, at certain intervals (pulse intervals), and transmits the transmission pulse signal as transmission pulse sequence 600 from transmission antenna 203. In FIG. 12, transmission pulse 601 is the first transmission pulse transmitted from base station 500. Transmission pulse 602 is the second transmission pulse transmitted after a certain interval passes. Transmission pulse 603 to transmission pulse 607 from then on are transmission pulses transmitted per certain interval.

Terminal 400 receives transmission pulse sequence 600 (transmission pulses 601 to 607) transmitted from base station 500, and transmits a re-radiation pulse corresponding to each transmission pulse to base station 500. Here, when transmitting a re-radiation pulse, terminal 400 regards the re-radiation pulse as a carrier wave, and performs ASK modulation on the re-radiation pulse according to the code sequence. By ASK modulation, a code sequence for retransmission is added to the re-radiation pulse.

As an example, consider the case where the code sequence for retransmission is expressed as "1010011" in binary numbers. At this time, the pulse sequence to be re-radiated by terminal 400 that receives transmission pulse sequence 600 (transmission pulses 601 to 607) are pulse sequence 610 (pulses 611 to 614).

Specifically, because the heading bit of the code sequence for retransmission is "1," terminal 400 transmits pulse 611 as the re-radiation pulse corresponding to transmission pulse 601. Next, because the second bit of the code sequence for retransmission is "0," terminal 400 does not transmit the re-radiation pulse corresponding to transmission pulse 602. Next, because the third bit of the code sequence for retransmission is "1," terminal 400 transmits pulse 612 as the re-radiation pulse corresponding to transmission pulse 603. Next, because the fourth bit and the fifth bit of the code sequence for retransmission are "0," terminal 400 does not transmit re-radiation pulses corresponding to transmission pulse 604 and transmission pulse 605. Next, because the sixth bit and the seventh bit of the code sequence for retransmission are "1," terminal 400 transmits pulse 613 and pulse 614 as the re-radiation pulses corresponding to transmission pulse 606 and transmission pulse 607, respectively.

By this means, terminal 400 transmits code sequence for re-radiation "1010011" using pulse sequence 610 (pulses 611 to 614).

In the same way, terminal 400 transmits code sequence for re-re-radiation "1010111" using pulse sequence 620 (pulses 621 to 624).

Base station 500 receives pulse sequence 610 and pulse sequence 620. Then, code sequence detection section 520 detects the code sequence for re-radiation and the code sequence for re-re-radiation from these pulse sequences received, and determines whether the received pulse is a re-radiation pulse or a re-re-radiation pulse.

For example, code sequence detection section 520 detects a code sequence for re-radiation or a code sequence for re-radiation by performing correlation calculation on pulse sequence 610 and pulse sequence 620 with the code sequence for re-radiation and the code sequence for re-re-radiation, respectively. That is, when the result of the correlation calculation on pulse sequence 610 and pulse sequence 620 with the code sequence for re-radiation exceeds a predetermined value, code sequence detection section 520 determines that the code sequence for re-radiation is detected. Further, when the result of the correlation calculation on pulse sequence 610 and pulse sequence 620 with the code sequence for re-re-radiation exceeds a predetermined value, code sequence detection section 520 determines that the code sequence for re-re-radiation is detected.

Further, a re-radiation pulse and a re-re-radiation pulse contained in pulse sequence 610 and pulse sequence 620 arrives alternately at base station 500. With reference to FIG. 12, re-radiation pulses and re-re-radiation pulses arrive at base station 500 in the order of pulse 611, pulse 621, pulse 612, pulse 622, pulse 613, pulse 623, pulse 614, and pulse 624.

Therefore, code sequence detection section 520 performs correlation calculation on pulse sequence 610 and pulse sequence 620 with the code sequence for re-radiation and the code sequence for re-re-radiation, at pulse intervals, by shifting the timing of the long-term clock signal, using the long-term clock signal output from timing signal output section 201.

Then, code sequence detection section 520 identifies the pulse sequence in which a code sequence for re-radiation is detected, as the pulse sequence containing a re-radiation pulse. Further, code sequence detection section 520 identifies the pulse sequence in which a code sequence for re-re-radiation is detected, as the pulse sequence containing a re-re-radiation pulse.

Code sequence detection section 520 outputs the reception timing of the pulse sequence in which the code sequence for re-radiation is detected, to distance calculation section 206, as information about the reception timing of the re-radiation pulse. Further, code sequence detection section 520 outputs the reception timing of the pulse sequence in which the code sequence for re-re-radiation is detected, to distance calculation section 206, as information about the reception timing of the re-re-radiation pulse.

By this means, upon detecting a re-re-radiation pulse, base station 500 can detect that the mode of terminal 400 is changed to the circuit calibration mode. Therefore, even when terminal 400 does not report that the transition to the circuit calibration will be made, to base station 500, base station 500 can recognize that the transition to the circuit calibration is made. Further, without performing control from outside so as to make the mode of terminal 400 transition to the circuit calibration mode, terminal 400 can perform transition to the circuit calibration mode autonomously. By this means, it is possible to simplify the radio distance measurement system, making it possible to reduce costs required for the system.

Further, because it is not necessary to perform communication to report that transition to the circuit calibration will be made between base station 500 and terminal 400, base station 500 can measure circuit delay time of terminal 400 without influencing the number of tags that can be measured within a certain time. Further, because it is not necessary to perform communication to report that transition to the circuit calibration mode will be made, it is possible to suppress power consumption of terminal 400 and base station 500.

Further, by detecting code sequences added to pulse sequence 610 and pulse sequence 620, base station 500 can determine whether the reception pulse is either a re-radiation pulse or a re-re-radiation pulse. Therefore, even in a multipath environment, by using a re-radiation pulse that arrives first and a re-re-radiation pulse, base station 500 can measure circuit delay time of terminal 400.

Further, each of a code sequence for re-radiation and a code sequence for a re-re-radiation can be a code determined uniquely from a specific ID of terminal 400. In this case, even when a re-radiation pulse and a re-re-radiation pulse are transmitted from a plurality of terminals, base station 500 can distinguish each terminal and extract a re-radiation pulse and a re-re-radiation pulse per terminal, so that it is possible to measure circuit delay time of each terminal.

(Embodiment 5)

A case will be described with the present embodiment where, as described with Embodiment 2, when a base station reports to a terminal that transition to the circuit calibration mode will be made, the terminal adds different code sequences to a re-radiation pulse and a re-re-radiation pulse.

[Configuration of Base Station]

Figure 13:
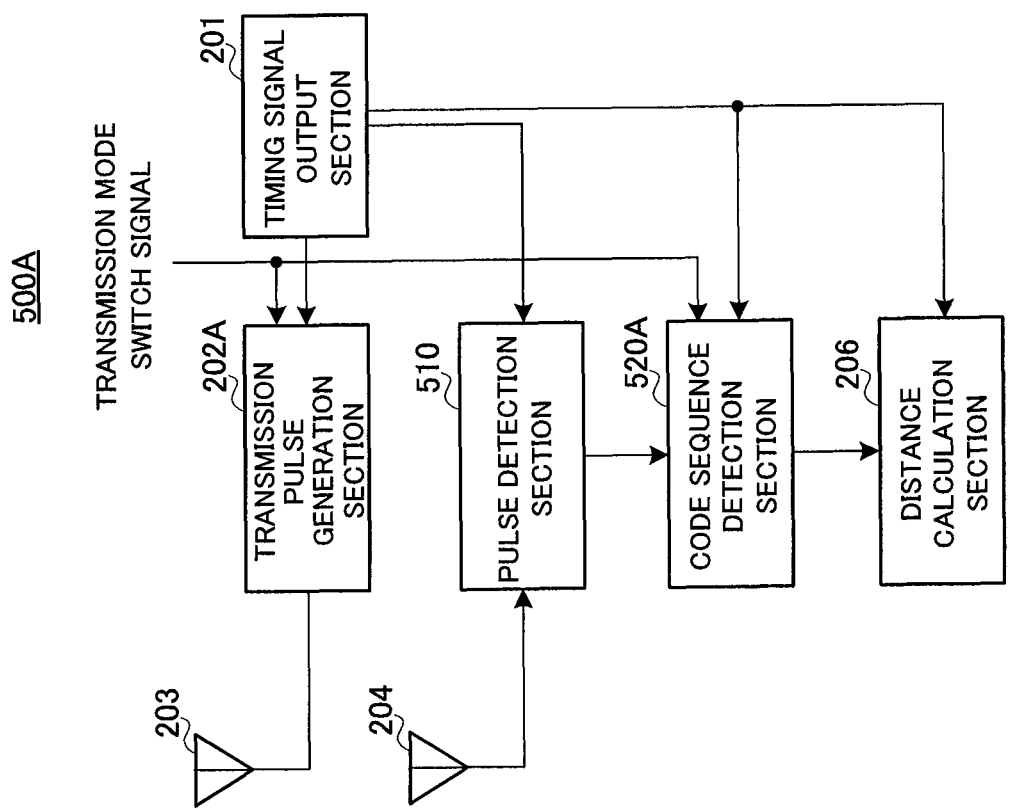
FIG. 13 is a block diagram showing a configuration of a base station according to Embodiment 5 of the present invention.

FIG. 13 is a block diagram showing a configuration of a base station according to the present embodiment of the present invention. In the base station according to the present embodiment in FIG. 13, parts that are the same as in FIG. 6 and FIG. 11 will be assigned the same reference numerals as in FIG. 6 and FIG. 11 and overlapping explanations will be omitted.

Code sequence detection section 520A detects a code sequence for re-radiation or a code sequence for re-re-radiation, from a reception pulse signal output from pulse detection section 510, using the long-term clock signal output from timing signal output section 201. Further, a method of detecting codes in code sequence detection section 520A will be described later. Further, upon detecting a code sequence for re-radiation or a code sequence for re-re-radiation, code sequence detection section 520A outputs information about the reception timing of a reception pulse signal used for these detections, to distance calculation section 206.

Figure 14:
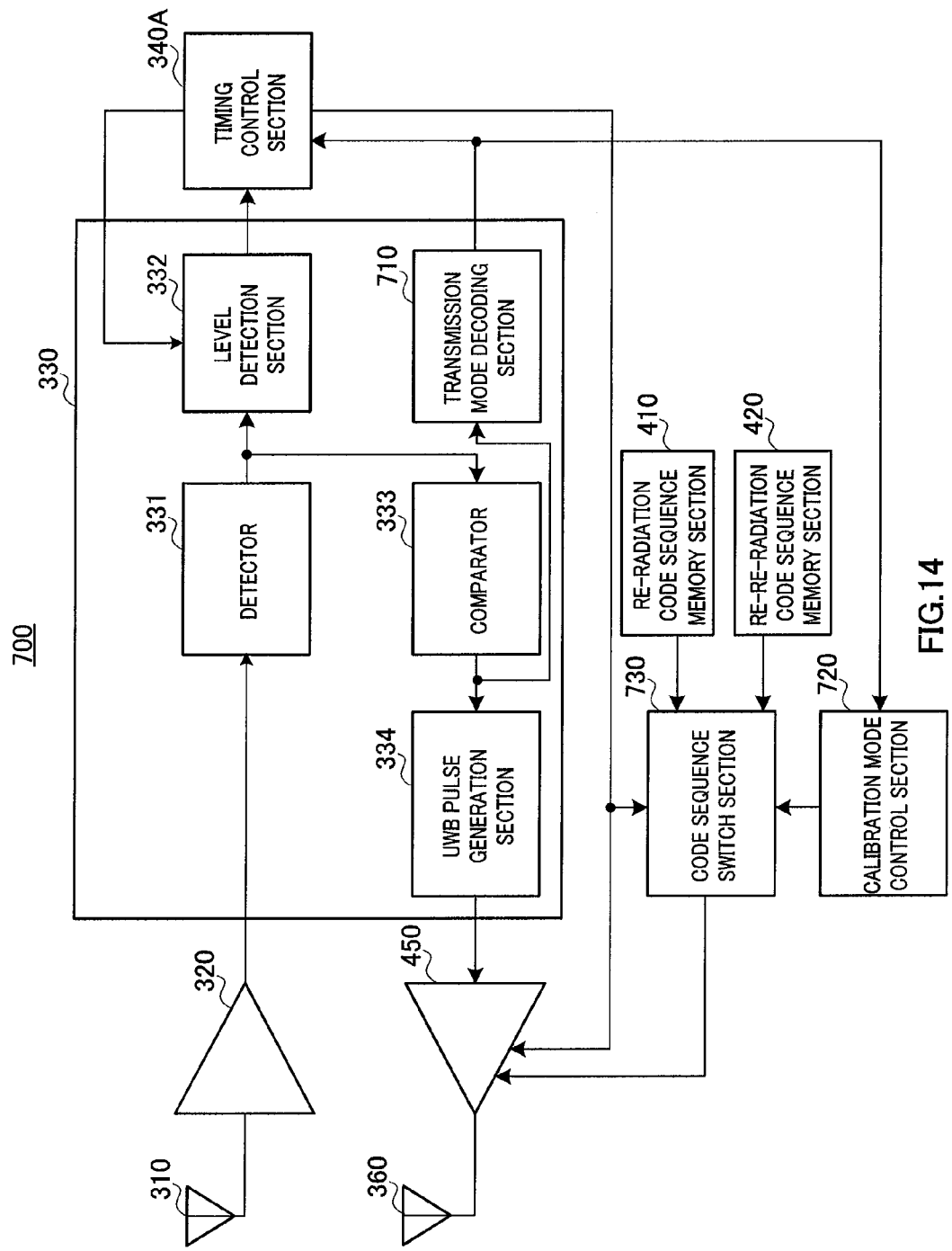
FIG. 14 is a block diagram showing a configuration of a terminal according to Embodiment 5.

FIG. 14 is a block diagram showing a configuration of a terminal according to the present embodiment of the present invention. In terminal 700 according to the present embodiment in FIG. 14, parts that are the same as in FIG. 7 and FIG. 10 will be assigned the same reference numerals as in FIG. 7 and FIG. 10 and overlapping explanations will be omitted.

Transmission mode decoding section 710, in the same way as in transmission mode decoding section 335, extracts a transmission mode switch signal from a digital signal binarized by comparator 333, and identifies whether the request from base station 500A is either the normal operational mode or the circuit calibration mode. Transmission mode decoding section 710 outputs the identification result about the transmission mode to timing control section 340A and calibration mode control section 720.

When the identification result about the transmission mode is the circuit calibration mode, calibration mode control section 720 generates a control signal to transition to the circuit calibration mode, in the same way as in calibration mode control section 430. Then, calibration mode control section 720 outputs a control signal indicating transition to the circuit calibration mode, to code sequence switch section 730.

Code sequence switch section 730 receives as input an on/off control signal output from timing control section 340A, a code sequence for re-radiation, a code sequence for re-re-radiation, and a control signal output from calibration mode control section 720. Upon receiving the control signal indicating transition to the circuit calibration mode, code sequence switch section 730 switches the code sequences to be added to a re-radiation pulse and a re-re-radiation pulse to respective code sequences that are different between the re-radiation pulse and the re-re-radiation pulse.

Specifically, code sequence switch section 730 generates a signal to differentiate the re-radiation pulse output period from the re-re-radiation pulse output period, using an on/off control signal. As shown in FIG. 5, an on-off control signal output from timing control section 340A is a signal that performs control so as to turn on transmission amplifier 450 during the period in which a re-radiation pulse is output (re-radiation pulse output period) and the period in which a re-re-radiation pulse is output (re-re-radiation pulse output period). For this reason, code sequence switch section 730 can generate a signal to differentiate the re-radiation pulse output period from the re-re-radiation pulse output period, based on an on/off control signal.

Then, code sequence switch section 730 selects either of a code sequence for re-radiation or a code sequence for re-re-radiation, based on the generated signal. Specifically, code sequence switch section 730 selects the code sequence for re-radiation when the generated signal indicates the re-radiation pulse output period, and selects the code sequence for re-re-radiation when the generated signal indicates the re-re-radiation pulse output period. Code sequence switch section 730 outputs the selected code sequence to transmission amplifier 450.

By this means, code sequence switch section 730 changes code sequences to be added to a re-radiation pulse and a re-re-radiation pulse, and outputs the changed code sequences to transmission amplifier 450.

Figure 15:
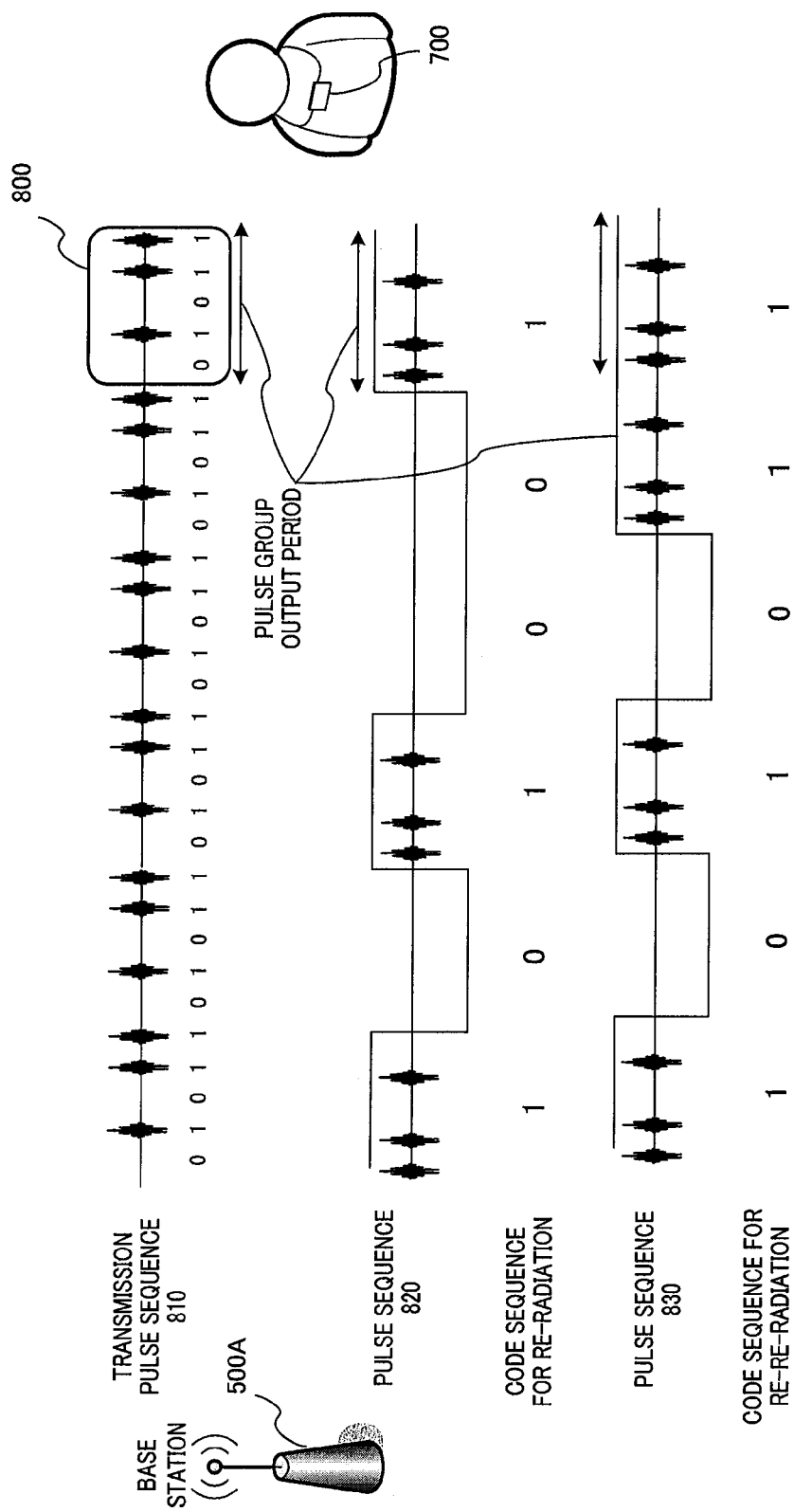
FIG. 15 shows examples of a pulse sequence received and transmitted between a base station and a terminal.

FIG. 15 shows examples of a pulse sequence received and transmitted between base station 500A and terminal 700.

In FIG. 15, transmission pulse sequence 810 indicates a pulse sequence transmitted from base station 500A. Further, in transmission pulse sequence 810, pulse group 800 is a pulse group obtained by ASK modulating the reference pulse signal according to code sequence "11010." Here, code sequence "11010" is a code sequence indicating the circuit calibration. Pulse group 800 contains ASK modulated pulses having a sequence length of code sequence "11010" (five in the example of FIG. 15). Hereinafter, the period in which pulses contained in pulse group 800 using code sequence "11010" indicating the circuit calibration is output, is called a pulse group output period.

Base station 500A repeatedly transmits pulse group 800 as transmission pulse sequence 810.

Then, terminal 700 performs transmission by adding a code sequence for re-radiation to a re-radiation pulse, in the same way as in Embodiment 4. However, according to the present embodiment, unlike Embodiment 4, terminal 700 uses the same code out of code sequences for re-radiation, from the heading timing of the re-radiation pulse output period of a re-radiation pulse corresponding to the transmission pulse that arrives first, out of transmission pulses contained in pulse group 800, until the pulse group output period ends.

In FIG. 15, pulse sequence 820 indicates that "101001" is added as a code sequence for re-radiation. That is, code sequence switch section 730 adds a code sequence for re-radiation by ASK modulating re-radiation pulses corresponding to the first pulse group 800, using "1." Then, code sequence switch section 730 adds a code sequence for re-radiation by ASK modulating re-radiation pulses corresponding to the second pulse group 800, using "0." From then on, code sequence switch section 730 adds a code sequence for re-radiation by ASK modulating re-radiation pulses corresponding to the third to sixth pulse groups 800, using "1," "0," "0," and "1," respectively.

In the same way, according to the present embodiment, terminal 700 uses the same code out of code sequences for re-re-radiation, from the heading timing of the re-re-radiation pulse output period of a re-re-radiation pulse corresponding to the transmission pulse that arrives first, out of transmission pulses contained in pulse group 800, until the pulse group output period ends.

In FIG. 15, pulse sequence 830 indicates that "101011" is added as a code sequence for re-re-radiation. That is, code sequence switch section 730 adds the code sequence for re-re-radiation by ASK modulating a re-re-radiation pulse corresponding to the first pulse group 800, using "1." Then, code sequence switch section 730 adds the code sequence for re-re-radiation by ASK modulating a re-re-radiation pulse corresponding to the second pulse group 800, using "0." From then on, code sequence switch section 730 adds a code sequence for re-re-radiation by ASK modulating re-re-radiation pulses corresponding to the third to sixth pulse groups 800, using "1," "0," "1," and "1," respectively.

As described above, code sequence switch section 730 adds a code sequence for re-radiation or a code sequence for re-re-radiation sequentially, per pulse group formed with pulses having a code length of a code sequence that indicates the order to transition to the circuit calibration mode.

By this means, when transmission mode decoding section 710 of terminal 700 detects the code sequence indicating the circuit calibration mode that is determined in advance, from a transmission pulse sequence transmitted from base station 500A, terminal 700 transitions to the circuit calibration mode. Then, terminal 700 transmits a re-radiation pulse and a re-re-radiation pulse according to the above procedures.

Base station 500A detects a code sequence for re-radiation and a code sequence for re-re-radiation that are to be added per pulse group. Further, the pulse group to which a code sequence for re-radiation and a code sequence for re-re-radiation are added contains a code sequence indicating the circuit calibration mode. Further, a re-radiation pulse and a re-re-radiation pulse arrives alternately at base station 500A, as described in Embodiment 4.

Therefore, code sequence detection section 520A performs correlation calculation on pulse sequence 820 and pulse sequence 830 with the code sequence indicating the circuit calibration mode, at an interval of performing correlation calculation between pulses, by shifting the long-period clock signal, using the long-period clock signal output from timing signal output section 201.

Further, code sequence detection section 520A performs correlation calculation on the result of the correlation calculation of pulse sequence 820 and pulse sequence 830 with the code sequence indicating the circuit calibration mode, with a code sequence for re-radiation and a code sequence for re-re-radiation, at an interval of outputting a pulse group, using the long-period clock signal output from timing signal output section 201. Then, when the obtained result of the correlation calculation exceeds a predetermined value, code sequence detection section 520A determines that a code sequence for re-radiation or a code sequence for re-re-radiation is detected. Then, code sequence detection section 520A identifies the pulse sequence in which a code sequence for re-radiation is detected, as the pulse sequence containing a re-radiation pulse. Further, code sequence detection section 520A identifies the pulse sequence in which a code sequence for re-re-radiation is detected, as the pulse sequence containing a re-re-radiation pulse.

Code sequence detection section 520A outputs the reception timing of the pulse sequence in which a code sequence for re-radiation is detected, as information about the reception timing of a re-radiation pulse, to distance calculation section 206. Further, code sequence detection section 520A outputs the reception timing of the pulse sequence in which a code sequence for re-re-radiation is detected, as information about the reception timing of a re-re-radiation pulse, to distance calculation section 206. By this means, base station 500A can measure the circuit delay time of terminal 700.

By this means, when reporting that transition to the circuit calibration mode will be made from base station 500A to terminal 700, terminal 700 adds a code sequence for re-radiation to a re-radiation pulse, and adds a code sequence for re-re-radiation to a re-re-radiation pulse, per length of the code sequence reporting the circuit calibration mode. Because base station 500A can generate a transmission mode switch signal using transmission pulse generation section 202A that generates a transmission pulse signal for distance measurement, it is possible to prevent addition of a new circuit for generating a transmission mode switch signal. Further, because terminal 700 can detect a transmission mode switch signal using the detection result of comparator 333, base station 500A can suppress increase of costs without adding a complex circuit, and perform control so that terminal 700 adopts the circuit calibration mode.

Further, by detecting code sequences added to pulse sequence 820 and pulse sequence 830, base station 500A can identify whether the reception pulse is a re-radiation pulse or a re-re-radiation pulse. Therefore, even in a multipath environment, by using a re-radiation pulse that arrives first and a re-re-radiation pulse, base station 500A can measure circuit delay time of terminal 700.

(Embodiment 6)

A radio distance measurement system that can accurately perform positioning, even in a multipath environment in which a reflector is present, will be described with the present embodiment.

In a multipath environment in which a reflector is present, a plurality of reflected waves are received at a base station.

Figure 16:
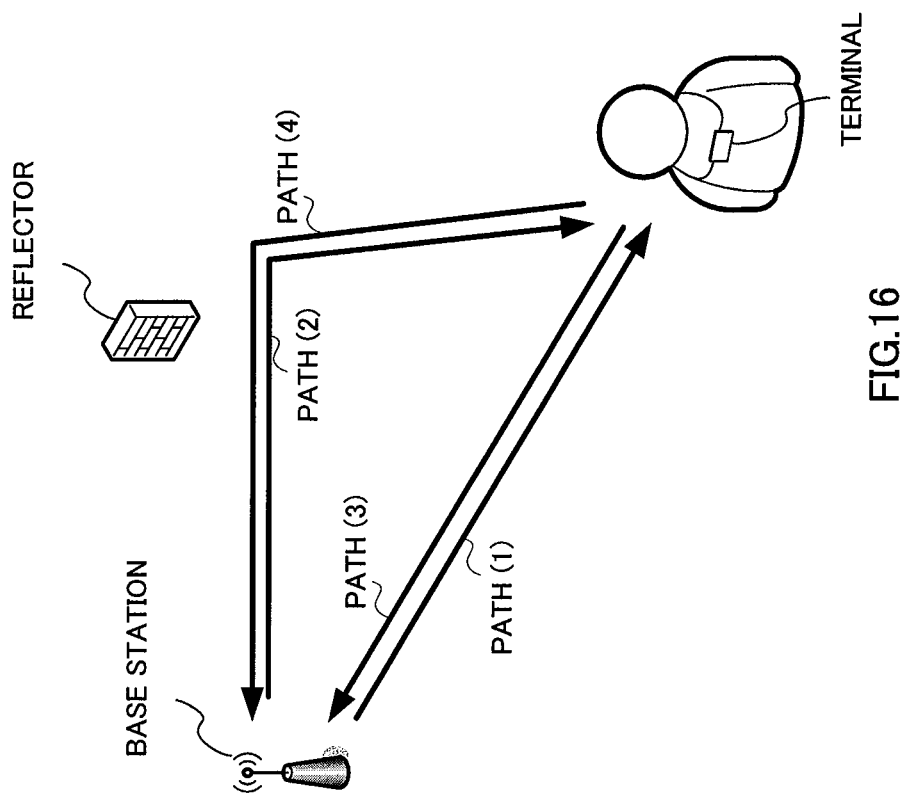
FIG. 16 shows an example of an arrangement of a base station, a terminal, and a reflector in a radio distance measurement system according to Embodiment 6 of the present invention.

FIG. 16 shows an example of an arrangement of a base station, a terminal, and a reflector in the radio distance measurement system according to the present embodiment of the present invention. Further, as configurations of a base station and a terminal, it is possible to employ either of the configurations described in Embodiment 1 to Embodiment 5.

In FIG. 16, path (1) and path (2) indicate paths in which a transmission pulse transmitted from a base station arrives at a terminal. As shown in FIG. 16, there are two paths in which a transmission pulse arrives at a terminal from a base station. Path (1) is a path in which a transmission pulse directly arrives at a terminal from a base station. On the other hand, path (2) is a path in which a transmission pulse is transmitted in the direction of a reflector from a base station, and, after being reflected by the reflector, arrives at a terminal.

In the same way, in FIG. 16, path (3) and path (4) indicate paths in which a transmission pulse transmitted from a terminal arrives at a base station. As shown in FIG. 16, there are two paths in which a transmission pulse arrives at a base station from a terminal. Path (3) is a path in which a transmission pulse directly arrives at a base station from a terminal. On the other hand, path (4) is a path in which a transmission pulse is transmitted in the direction of a reflector from a terminal, and, after being reflected by the reflector, arrives at a base station.

FIG. 17 shows transmission and reception pulse signals, when there are two kinds of paths between a base station and a terminal, as shown in FIG. 16. In FIG. 17, the horizontal axis indicates time and the vertical axis indicates pulse amplitude. Further, FIG. 17 shows only pulse signals relating to a re-radiation pulse, out of transmission and reception pulse signals.

Figure 17A:
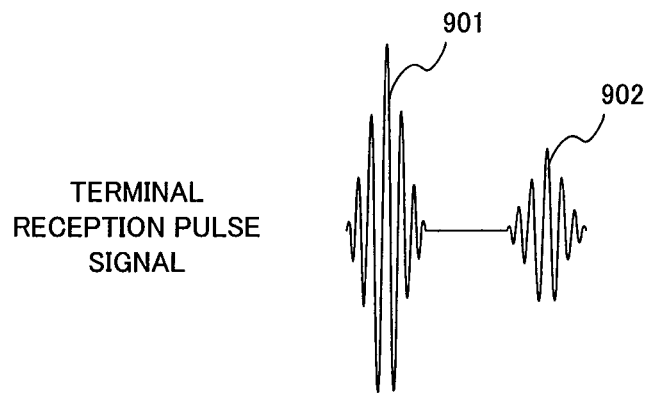
FIG. 17 shows transmission and reception pulse signals of a terminal and a reception pulse signal of a base station.

FIG. 17A shows reception pulse signals that are transmitted by a base station as transmission pulse signals and are received by a terminal. Reception pulse 901 indicates an arriving wave (direct wave) that is transmitted from a base station and directly arrives at a terminal (path (1)). Reception pulse 902 indicates an arriving wave (reflected wave) that is transmitted as a transmission pulse from a base station, is reflected by a reflector, and arrives at a terminal (path (2)).

Figure 17B:
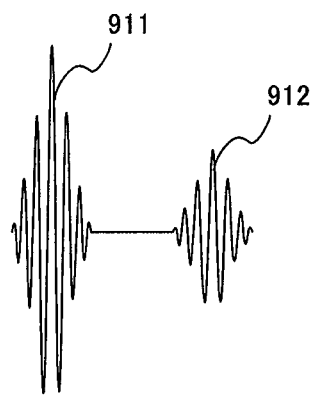

FIG. 17B indicates transmission pulse signals (re-radiation pulses) transmitted from the terminal that received reception pulse 901 and reception pulse 902. Re-radiation pulse 911 indicates a pulse corresponding to reception pulse 901, and re-radiation pulse 912 indicates a pulse corresponding to reception pulse 902.

Figure 17C:
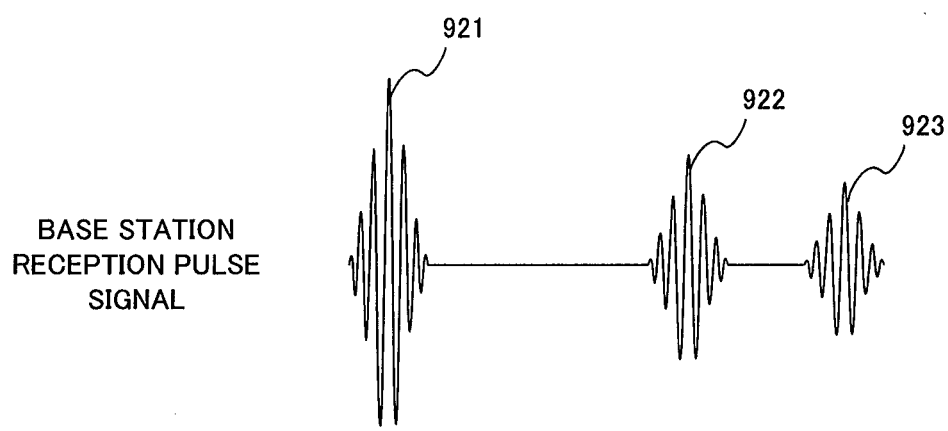

FIG. 17C indicates reception pulse signals received by a base station, when a terminal transmits transmission pulse signals (re-radiation pulses) shown in FIG. 17B.

Reception pulse 921 indicates a pulse that is transmitted by a terminal as re-radiation pulse 911 and directly arrives at a base station. That is, reception pulse 921 is a pulse that travels the paths (path (1) and path (3)) in which reception pulse 901 transmitted from a base station and received as a direct wave at a terminal is transmitted as re-radiation pulse 911 from the terminal and is received as a direct wave at the base station.

Reception pulse 922 is a synthesized wave of following pulse (1) and pulse (2).

Pulse (1): a pulse that travels in the arrival paths (path (1) and path (4)) in which reception pulse 901 transmitted from a base station and received as a direct wave at a terminal, is transmitted as re-radiation pulse 911 from the terminal and is received as a reflected wave at the base station. Pulse (2): a pulse that travels in the arrival paths (path (2) and path (3)) in which reception pulse 902 that is transmitted from a base station, is reflected by a reflector, such as a wall, and is received as a reflected wave at a terminal, is transmitted as re-radiation pulse 912 from the terminal and received as a direct wave at the base station.

Reception pulse 923 indicates a pulse that is re-radiation pulse 912 transmitted from a terminal is reflected by a reflector, such as a wall, and arrives at a base station. That is, reception pulse 923 is a pulse that travels in the arrival paths (path (2) and path (4)) in which reception pulse 902 that is transmitted from a base station, is reflected by a reflector, such as a wall, and is received as a reflected wave at a terminal, is transmitted as re-radiation pulse 912 from the terminal, is reflected by a reflector, such as a wall, and is received as a reflected wave at the base station.

FIG. 18 shows transmission and reception pulse signals when there are two paths between a base station and a terminal, as shown in FIG. 16. In FIG. 18, the horizontal axis indicates time and the vertical axis indicates pulse amplitude.

FIG. 18A shows transmission pulse signals transmitted from a terminal, when the terminal receives the reception pulse signals shown in FIG. 17A. Further, pulses in FIG. 18A that are the same as in FIG. 17B will be assigned the same reference numerals as in FIG. 17B and overlapping explanations will be omitted.

In FIG. 18A, pulse 913 is a pulse that is retransmitted corresponding to re-radiation pulse 911 after a terminal receives re-radiation pulse 911. That is, pulse 913 is a re-re-radiation pulse corresponding to pulse 901.

Here, the terminal does not re-re-transmit all reception pulses contained in a reception pulse signal, but re-re-transmits only a reception pulse that is required to measure circuit delay time of the terminal. For example, a terminal measures the intensity of a reception pulse and performs control so as to re-re-transmit only the reception pulse having the greatest intensity. The reception pulse signal shown in FIG. 17A will be described below as an example. As shown in FIG. 17A, the intensity of reception pulse 901 is greater than the intensity of reception pulse 902. Therefore, a terminal transmits only re-re-radiation pulse 913 corresponding to reception pulse 901, and performs control so as not to transmit re-re-radiation pulse corresponding to reception pulse 902. As described above, reception pulse 902 is an arriving wave (reflected wave) that is reception pulse 901 transmitted from a base station, is reflected by a reflector, such as a wall, and arrives at a terminal. Therefore, a terminal re-re-transmits only re-re-radiation pulse 913 corresponding to reception pulse 901 and performs control so as not to transmit a re-re-radiation pulse corresponding to reception pulse 902, so that unnecessary pulses will not be transmitted from a terminal. Then, by this means, it is possible to alleviate the influence on other tags in the area of the base station.

Further, FIG. 18B indicates a reception pulse signal received at a base station, when a terminal transmits a transmission pulse signal shown in FIG. 18A. Further, pulses in FIG. 18B that are the same as in FIG. 17C will be assigned the same reference numerals as in FIG. 17C and overlapping explanations will be omitted.

Reception pulse 924 indicates a pulse that is re-re-radiation pulse 913 that is transmitted from a terminal and is received at a base station as a direct wave. Reception pulse 925 is a pulse that is re-re-radiation pulse 913 that is transmitted from a terminal, is reflected by a reflector, and is received at a base station. That is, reception pulse 924 and reception pulse 925 are each pulse that is reception pulse 901 that is re-re-radiated from a terminal and is received at a base station again.

That is, the timing control section of a terminal according to the above embodiments generates an on/off control signal that becomes a high level when a predetermined time passes after the detection timing in which rough synchronization with reception pulse 902 is obtained. At this time, the predetermined time is the smallest value of the circuit delay time of a terminal or shorter. By this means, the transmission amplifier is turned on at the heading timing of the period in which re-radiation pulse 912 corresponding to reception pulse 902 is output from the tag transreceiver circuit (re-radiation output period), so that re-radiation pulse 912 is transmitted from the transmission antenna. However, according to the present embodiment, because the intensity of reception pulse 901 is greater than the intensity of reception pulse 902, the timing control section generates an on/off control signal that does not turn on the transmission amplifier, during the period in which a re-re-radiation pulse corresponding to reception pulse 902 is output from the tag transreceiver circuit (re-radiation output period).

A case has been described with the above embodiments where, when re-re-radiating a pulse transmitted from a base station, a terminal transmits only a re-re-radiation pulse corresponding to the reception pulse having the greatest intensity, out of reception pulse signals. In this case, as described with Embodiment 4 and Embodiment 5, it is also possible to add a code sequence for re-radiation to a re-radiation pulse, and add a code sequence for re-re-radiation to a re-re-radiation pulse.

Although cases have been described with the above embodiments where a terminal adopts the semi-passive method, the present invention is not limited to this, and it is equally possible to apply the present invention to the case where a terminal adopts the active method.

Although cases have been described with the above embodiments where either of a base station or a terminal has a separate transmission antenna and reception antenna, the present invention is not limited to this, and it is equally possible to use one antenna combining a transmission antenna and a reception antenna, by demultiplexing a signal using a circulator, for example.

The disclosures of Japanese Patent Application No. 2009-109479, filed on Apr. 28, 2009, and Japanese Patent Application No. 2009-270523, filed on Nov. 27, 2009, including the specifications, drawings and abstracts, are incorporated herein by reference in their entirety.

INDUSTRIAL APPLICABILITY

A radio terminal apparatus, a radio base station apparatus, a radio distance measurement system, and a radio distance measurement method according to the present invention can improve the accuracy of distance measurement between a UWB reader and a UWB tag, regardless of whether the active method is employed or the semi-passive method is employed, and are useful as a radio positioning apparatus and a radio distance measurement apparatus, for example, and, further, can be applied to a radio sensor, for example.

REFERENCE SIGNS LIST 200, 200A, 200B, 500, 500A Base station
201 Timing signal output section
202, 202A Transmission pulse generation section
203, 360 Transmission antenna
204, 310 Reception antenna
205, 510 Pulse detection section
206 Distance calculation section
300, 300A, 400, 700 Terminal
320 Reception amplifier
330, 330A Tag transreceiver circuit
331 Detector
332 Level detection section
333 Comparator
334 UWB pulse generation section
335, 710 Transmission mode decoding section
340, 340A Timing control section
350, 450 Transmission amplifier
410 Re-radiation code sequence memory section
420 Re-re-radiation code sequence memory section
430, 720 Calibration mode control section
440, 730 Code sequence switch section
520, 520A Code sequence detection section

The invention claimed is:

1. A radio terminal apparatus in a radio distance measurement system that measures a distance between the radio terminal apparatus and a radio base station apparatus using a pulse signal, the radio terminal apparatus comprising:
a reception antenna configured to receive the pulse signal from the radio base station apparatus;
a detector that detects the received pulse signal and outputs a first detection signal based on the received pulse signal, and that detects a re-radiation pulse signal generated by the radio terminal apparatus and outputs a second detection signal based on the detected re-radiation pulse signal;
a generator that generates the re-radiation pulse signal, to be transmitted to the radio base station apparatus, according to the first detection signal, and that generates a re-re-radiation pulse signal to be transmitted to the radio base station apparatus, according to the second detection signal;
an amplifier configured to amplify the re-radiation pulse signal and the re-re-radiation pulse signal;
a transmission antenna configured to transmit the amplified re-readiation pulse signal and the amplified re-re radiation pulse signal; and
a timing control that outputs a control signal that controls the amplifier on and off, so as to amplify the re-radiation pulse signal and the re-re-radiation pulse signal based on value of a circuit delay time of the radio terminal apparatus between when the pulse signal is received at the radio terminal apparatus and when the re-radiation pulse signal is transmitted from the radio terminal apparatus.

2. The radio terminal apparatus according to claim 1, wherein:
the control signal of the timing control becomes a high level during a period in which the re-radiation pulse signal and the re-re-radiation pulse signal are output to the amplifier; and
the amplifier performs amplification while the control signal is at the high level.

3. The radio terminal apparatus according to claim 1, further comprising:
a mode control-section that switches a mode to a calibration mode for measuring the circuit delay time of the radio terminal apparatus or to a distance measurement mode for measuring the distance between the radio terminal apparatus and the radio base station apparatus;
a memory configured to store a first code sequence for re-radiation and a second code sequence for re-re-radiation that is different from the first code sequence for re-radiation; and
a switch that outputs the first code sequence for re-radiation to the amplifier during a period in which the re-radiation pulse signal is output to the amplifier, and outputs the second code sequence for re-re-radiation to the amplifier during a period in which the re-re-radiation pulse signal is output to the amplifier, in the calibration mode
wherein the amplifier performs amplification according to the first or second code sequence output from the switch.

4. The radio terminal apparatus according to claim 1, further comprising a mode identifier that identifies between a calibration mode for measuring the circuit delay time of the radio terminal apparatus and a distance measurement mode for measuring the distance between the radio terminal apparatus and the radio base station apparatus, based on a transmission mode switch signal;
wherein the timing control outputs the control signal, to the amplifier, in the calibration mode, wherein the amplifier amplifies the re-radiation pulse signal and the re-re-radiation pulse signal based on the control signal and outputs the control signal to the amplifier, in the distance measurement mode, wherein the amplifier amplifies only the re-radiation pulse signal based on the control signal.

5. The radio terminal apparatus according to claim 4, wherein the transmission mode switch signal is reported by an on or off state of an ultra wide band pulse signal.

6. The radio terminal apparatus according to claim 4, further comprising:
a memory configured to store a first code sequence for re-radiation and a second code sequence for re-re-radiation that is different from the first code sequence for re-radiation; and
a switch that outputs the first code sequence for re-radiation to the amplifier during a period in which the re-radiation pulse signal is output to the amplifier, and outputs the second code sequence for re-re-radiation to the amplifier during a period in which the re-re-radiation pulse signal is output to the amplifier, based on the control signal;
wherein the amplifier performs amplification according to the first or second code sequence output from the switch.

7. A radio base station apparatus in a radio distance measurement system that measures a distance between the radio base station apparatus and a radio terminal apparatus using a pulse signal, the radio base station apparatus comprising:
a transmitter configured to transmit a pulse signal to the radio terminal apparatus;
a receiver configured to receive a re-radiation pulse signal and a re-re-radiation pulse signal from the radio terminal apparatus, the re-radiation pulse being generated by the radio terminal apparatus re-radiating the pulse signal transmitted from the radio base station apparatus and the re- re-radiation pulse signal that is being generated by the radio terminal apparatus re-re-radiating the re-radiation pulse signal; and a measurer that measures a value of a circuit delay time of the radio terminal apparatus based on a time difference between when the re-radiation pulse signal is received at the radio base station apparatus and when the re-re-radiation pulse signal is received at the radio base station apparatus.

8. The radio base station apparatus according to claim 7, wherein the measurer measures a response period of a wave, which includes the circuit delay time of the radio terminal apparatus, based on a time difference between when the pulse signal is transmitted to the radio terminal apparatus and when the re-radiation pulse signal is received from the radio terminal apparatus, and the measurer calculates the distance between the radio base station apparatus and the radio terminal apparatus based on the response period and the circuit delay time of the radio terminal apparatus.

9. The radio base station apparatus according to claim 7, further comprising a radio wave arrival direction estimation section,
wherein the measurer identifies a pulse signal arriving in a shortest time as the re-radiation pulse signal, and identifies a pulse signal arriving from the same direction as the direction of the re-radiation pulse signal as the re-re-radiation pulse signal, and measures the circuit delay time of the radio terminal apparatus.

10. A radio distance measurement system that measures a distance between a radio base station apparatus and a radio terminal apparatus using a pulse signal, wherein:
the radio base station apparatus comprises:
transmitter configured to transmit a pulse signal to the radio terminal apparatus;
a receiver configured to receive a re-radiation pulse signal that is and a re-re-radiation pulse signal from the radio terminal apparatus, the re-radiation pulse being generated by the radio terminal apparatus re-radiating the pulse signal transmitted from the radio base station apparatus, and the re-re-radiation pulse signal being generated by the radio terminal apparatus re-re-radiating the re-radiation pulse signal; and
a measurer that measures a value of a circuit delay time of the radio terminal apparatus based on a time difference between when the re-radiation pulse signal is received at the radio base station apparatus and when the re-re-radiation pulse signal is received at the radio base station apparatus; and
the radio terminal apparatus comprises:
a reception antenna configured to receive the pulse signal from the radio base station apparatus;
a detector that detects the received pulse signal and outputs a first detection signal based on the received pulse and that detects the re-radiation pulse signal and outputs a second detection signal based on the detected re-radiation pulse signal;
a generator that generates the re-radiation pulse signal, to be transmitted to the radio base station apparatus, according to the first detection signal, and re-re-radiation pulse signal, to be transmitted to the radio base station apparatus, according to the second detection signal;
an amplifier configured to amplify the re-radiation, pulse signal and the re-re-radiation pulse signal;
a transmission antenna configured to transmit the amplified re-radiation pulse signal; and
a timing control that outputs a control signal that controls the amplifier on and off so as to amplify the re-radiation pulse signal and the re-re-radiation pulse signal based on the value of the circuit delay time of the radio terminal apparatus between when the pulse signal is received at the radio terminal apparatus and when the re-radiation pulse signal is transmitted from the radio terminal apparatus.

11. A radio distance measurement method of measuring a distance between a radio base station apparatus and a radio terminal apparatus using a pulse signal, the method comprising:
at the radio base station apparatus:
transmitting a pulse signal to the radio terminal apparatus;
at the radio terminal apparatus:
receiving the pulse signal from the radio base station apparatus;
detecting the received pulse signal and outputting a first detection signal based on the received pulse signal;
generating a re-radiation pulse signal, to be transmitted to the radio base station apparatus, according to the first detection signal;
detecting the re-radiation pulse signal and outputting a second detection signal based on the detected re-radiation pulse signal;
generating a re-re-radiation pulse signal, to be transmitted to the radio base station apparatus, according to the second detection signal;
amplifiying the re-radiation pulse signal and the re-re-radiation pulse signal; and
transmitting the amplified re-radiation pulse signal and the amplified re-re- radiation pulse signal; and
at the radio base station apparatus:
receiving the re-radiation pulse signal and the re-re-radiation pulse signal;
measuring a circuit delay time of the radio terminal apparatus based on a time difference between when the re-radiation pulse signal is received at the radio base station apparatus and when the re-re-radiation pulse signal is received at the radio base station apparatus; and
measuring a response period of a radio wave which includes the circuit delay time of the radio terminal apparatus, based on a time difference between when the pulse signal is transmitted to the radio terminal apparatus and when the re-radiation pulse signal is received from the radio terminal apparatus, and calculating the distance between the radio base station apparatus and the radio terminal apparatus based on the response period and the circuit delay time of the radio terminal apparatus.

* * * * *